(12) United States Patent
Atkinson et al.

(10) Patent No.: US 10,237,139 B2
(45) Date of Patent: Mar. 19, 2019

(54) CROSS-LAYER LINK DISCOVERY

(71) Applicants: Gary W. Atkinson, Freehold, NJ (US);
Young J. Kim, Basking Ridge, NJ (US)

(72) Inventors: Gary W. Atkinson, Freehold, NJ (US);
Young J. Kim, Basking Ridge, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 9 days.

(21) Appl. No.: 15/475,096

(22) Filed: Mar. 30, 2017

(65) Prior Publication Data
US 2018/0287884 A1    Oct. 4, 2018

(51) Int. Cl.
*H04L 12/26*     (2006.01)
*H04L 12/24*     (2006.01)

(52) U.S. Cl.
CPC .............. *H04L 41/14* (2013.01); *H04L 43/10* (2013.01)

(58) Field of Classification Search
CPC ..... H04L 43/10; H04L 43/50; H04L 43/0876; H04L 43/16; H04L 45/04; H04L 45/26; H04L 45/70; H04L 43/0882; H04L 45/124
See application file for complete search history.

(56) References Cited

U.S. PATENT DOCUMENTS

| | | | |
|---|---|---|---|
| 7,116,642 B2 | 10/2006 | Tofinetti et al. | |
| 7,197,546 B1 | 3/2007 | Bagga et al. | |
| 7,706,383 B2 | 4/2010 | Nagarajan et al. | |

(Continued)

FOREIGN PATENT DOCUMENTS

| | | |
|---|---|---|
| WO | WO 2001/080596 | 10/2001 |
| WO | WO 2013/028241 | 2/2013 |
| WO | WO 2016/056002 | 4/2016 |

OTHER PUBLICATIONS

Geisler et al., "Optical Device Discovery," https://tools.ietf.org/html/draft-geisler-optical-device-discovery-02, IETF, Aug. 25, 2016, 9 pages.

(Continued)

*Primary Examiner* — Mohamed A Kamara
(74) *Attorney, Agent, or Firm* — Tong, Rea, Bentley & Kim, LLC

(57) ABSTRACT

The present disclosure generally discloses a cross-layer link discovery capability configured to support discovery of cross-layer links of a communication network. The cross-layer link discovery capability may be configured to support discovery of cross-layer links between packet network elements and optical network elements of a communication network. The cross-layer link discovery capability may be configured to support automated and reliable discovery of cross-layer links between ports of packet network elements and ports of optical network elements of a communication network. The cross-layer link discovery capability may be configured to support discovery of cross-layer links between ports of packet network elements and ports of optical network elements based on various port matching techniques, such as port classification, port isolation based on port identification, port isolation based on port probing (e.g., active probing, passive probing based on traffic migration, passive probing based on traffic injection, or other port probing types), or the like.

24 Claims, 13 Drawing Sheets

(56) References Cited

U.S. PATENT DOCUMENTS

| | | | |
|---|---|---|---|
| 7,983,691 B1 | 7/2011 | Wong et al. | |
| 8,363,556 B2* | 1/2013 | Dunn | H04L 41/0659 370/242 |
| 8,798,059 B1* | 8/2014 | Kommula | H04L 12/4641 370/389 |
| 9,853,879 B2* | 12/2017 | Walker | H04L 45/02 |
| 2015/0215183 A1* | 7/2015 | Bucci | H04L 43/12 370/252 |
| 2016/0065469 A1* | 3/2016 | Chanda | H04L 41/12 709/238 |
| 2017/0126516 A1* | 5/2017 | Tiagi | H04L 43/04 |
| 2018/0091251 A1* | 3/2018 | Hanneman, Jr. | H04J 14/0256 |

OTHER PUBLICATIONS

Biknell, "TL1 Device Monitoring on the Cheap," North American Network Operators' Group (NANOG), NANOG38, https://www.nanog.org/meetings/nanog38/presentations/bicknell.pdf, St. Louis, Missouri, Oct. 8, 2016, 20 pages.

Commvault, "Setting Up Alerts and Notifications—SNMP Traps," Commvault Systems, https://documentation.commvault.com/commvault/v10/article?p=features/alerts/setup_alerts_snmp_trap.htm, accessed Dec. 30, 2016, 14 pages.

Kilper et al., "Power trends in communication networks," IEEE Journal on Selected Topics in Quantum Electronics, vol. 17, Issue 2, Oct. 28, 2010, pp. 275-284.

* cited by examiner

CROSS-LAYER LINK DISCOVERY

TECHNICAL FIELD

The present disclosure relates generally to communication networks and, more particularly but not exclusively, to discovery of links in communication networks.

BACKGROUND

Communication networks typically support communications using various communication layers. Many communication networks may support communications at multiple communication layers using cross-layer links between network elements operating at different communication layers.

SUMMARY

The present disclosure generally discloses a cross-layer link discovery capability configured to support discovery of cross-layer links in a communication network.

In at least some embodiments, an apparatus is provided. The apparatus includes a processor and a memory communicatively connected to the processor. The processor is configured to identify a set of ports including a set of ports of a packet network element and a set of ports of an optical network element, each of the ports having a respective connection associated therewith. The processor is configured to classify the ports, based on the respective connection types of the ports, to determine thereby a set of compatible ports, the set of compatible ports including at least one of the ports of the packet network element and at least one of the ports of the optical network element. The processor is configured to perform port isolation processing for the set of compatible ports, based on the respective connection types of the compatible ports, to identify a matching port pair including one of the ports of the packet network element and one of the ports of the optical network element that are connected via a cross-layer link. In at least some embodiments, a non-transitory computer-readable storage medium stores instructions which, when executed by a computer, cause the computer to perform a corresponding method for supporting discovery of cross-layer links in a communication network. In at least some embodiments, a corresponding method for supporting discovery of cross-layer links in a communication network is provided.

In at least some embodiments, an apparatus is provided. The apparatus includes a processor and a memory communicatively connected to the processor. The processor is configured to receive, by a controller, port probing information associated with a port probing initiated by the controller for a first port of a first network element configured for communication at a first communication layer. The processor is configured to receive, by the controller, port activity information indicative of port activity at a second port of a second network element configured for communication at a second communication layer different than the first communication layer. The processor is configured to identify, by the controller based on correlation of the port probing information and the port activity information, a cross-layer link connecting the first port and the second port. In at least some embodiments, a non-transitory computer-readable storage medium stores instructions which, when executed by a computer, cause the computer to perform a corresponding method for supporting discovery of cross-layer links in a communication network. In at least some embodiments, a corresponding method for supporting discovery of cross-layer links in a communication network is provided.

In at least some embodiments, an apparatus is provided. The apparatus includes a first network element configured for communication at a first communication layer and including a first port and a second network element configured for communication at a second communication layer and including a second port, wherein the first port and the second port are configured to be connected via a cross-layer link. The first network element is configured to receive, from a first element controller associated with the first network element, probe information indicative of probing to be performed on the first port. The first network element is configured to perform probing on the first port based on the probe information indicative of probing to be performed on the first port. The second network element is configured to detect a set of events associated with the second port. The second network element is configured to send, toward a second element controller associated with the second network element, event information indicative of the set of events associated with the second port. In at least some embodiments, a non-transitory computer-readable storage medium stores instructions which, when executed by a computer, cause the computer to perform a corresponding method for supporting discovery of cross-layer links in a communication network. In at least some embodiments, a corresponding method for supporting discovery of cross-layer links in a communication network is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses a cross-layer link discovery capability configured to support discovery of cross-layer links of a communication network. The cross-layer link discovery capability may be configured to support discovery of cross-layer links between packet network elements and optical network elements of a communication network. The cross-layer link discovery capability may be configured to support automated and reliable discovery of cross-layer links between ports of packet network elements and ports of optical network elements of a communication network. The cross-layer link discovery capability may be configured to support discovery of cross-layer links between ports of packet network elements and ports of optical network elements based on various port matching techniques (e.g., port classification, port isolation based on port identification, port isolation based on port probing, or the like, as well as various combinations thereof). The cross-layer link discovery capability may be configured to support automated (remote) discovery of links interconnecting packet and optical equipage at one or more network sites in a multi-vendor network. It will be appreciated that these and various other embodiments and advantages or potential advantages of the cross-layer link discovery capability may be further understood by way of reference to the example communication system of FIG. 1.

Figure 1:
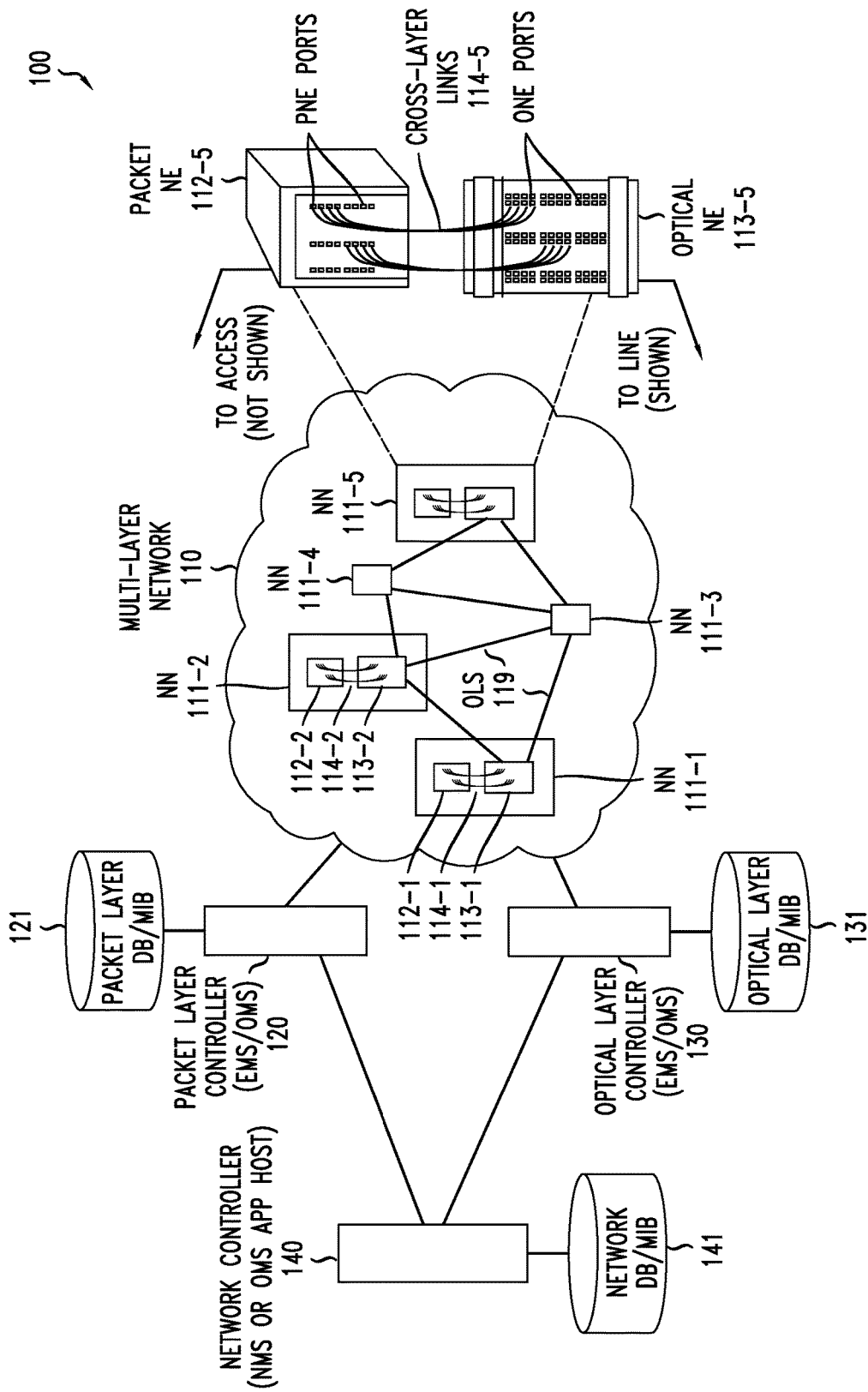
FIG. 1 depicts an example communication system configured to support cross-layer link discovery for discovery of cross-layer links between packet network elements and optical network elements.

FIG. 1 depicts an example communication system configured to support cross-layer link discovery for discovery of cross-layer links between packet network elements and optical network elements.

The communication system 100 includes a multi-layer network (MLN) 110 supporting multi-layer communications between network elements operating at the packet layer and the optical layer, a packet layer controller (PLC) 120, an optical layer controller (OLC) 130, and a network controller (NC) 140.

The MLN 110, as noted above, is configured to support cross-layer communications between network elements operating at the packet layer and the optical layer (and, accordingly, also may be referred to herein as a packet-optical (P-O) network).

The MLN 110 includes a set of network nodes (NNs) 111-1-111-5 (collectively, NNs 111) configured to support communications within MLN 110. The NNs 111 include three cross-layer NNs (illustratively, NNs 111-1, 111-2, and 111-5) that are configured to support communications at both the packet layer and the optical layer and also includes a number of optical-only NNs (illustratively, NNs 111-3 and 111-4) configured to support communications at the optical layer). The three cross-layer NNs 111 each include a packet network element (PNE) 112 and an optical network element (ONE) 113 interconnected by a set of cross-layer links (CLLs) 114 (illustratively, NN 111-1 includes a PNE 112-1 and an ONE 113-1 interconnected by a set of CLLs 114-1, NN 111-2 includes a PNE 112-2 and an ONE 113-2 interconnected by a set of CLLs 114-2, and NN 111-5 includes a PNE 112-5 and an ONE 113-5 interconnected by a set of CLLs 114-5). The CLLs 114 are communication links between ports of PNEs 112 and ports of ONEs 113 at NNs 111, respectively (namely, at a given NN 111, a given CLL 114 connects a port of the PNE 112 at the given NN 111 and a port of the ONE 113 at the given NN 111). The MLN 110 also includes a set of optical links (OLs) 119 which connect the NNs 111 at the optical layer (illustratively, supporting various interconnections between the ONEs 113 of the three cross-layer NNs 111 and the two optical-only NNs 111). The NNs 111 may correspond to network sites (e.g., the NNs 111 may be located at respective network sites (e.g., geographic locations at which the NNs 111 may be deployed). The ports of a PNE 112 and the ports of an ONE 113 at an NN 111 may be referred to herein as a packet-optical (P-O) port set of the NN 111 or of a site at which the NN 111 is located. It will be appreciated that the NNs 111 may be provided by a common vendor or different vendors, the PNEs 112 may be provided by a common vendor or different vendors, the ONEs 113 may be provided by a common vendor or different vendors, or the like. It will be appreciated that, although presented herein as being part of an NN 111, the associated PNE 112 and ONE 113 of an NN 111 may be considered to be separate non-integrated devices (possibly from different vendors) interconnected using the CLLs 114 therebetween. It will be appreciated that, although primarily presented with respect to an arrangement in which the NNs 111 of the MLN 110 correspond to respective network sites, the MLN 110 may include one or more network sites, a network site may include one or more NNs 111, or the like, as well as various combinations thereof.

The PNEs 112 are packet network elements configured to support packet layer communications within the MLN 110. The PNEs 112 include various ports, including ports which may be connected to other packet-layer devices (omitted from FIG. 1 for purposes of clarity) and ports which may be connected to ports of respective ONEs 113 via respective CLLs 114 as depicted in FIG. 1 (denoted as PNE ports of the PNEs 112, and which also may be referred to as ports of the PNE 112 or packet ports of the PNE 112 where the term "packet port" may refer to the port being part of the PNE 112 rather than referring to the connection type supported by the port). The PNEs 112 are configured to support port control functions (e.g., activating and deactivating ports), port monitoring functions (e.g., activity detection on the ports, alarm monitoring and detection on the ports, or the like), or the like, as well as various combinations thereof. The PNEs 112 are configured to be communicated with remotely via one or more management channels for element management, configuration, control, and information. The PNEs 112 are configured to communicate with the PLC 120, based on various control protocols as discussed further below, such that the PLC 120 may control the PNEs 112, the PNEs 112 may provide acknowledgments (e.g., acknowledging execution of commands) to the PLC 120, the PNEs 112 may report events (e.g., alarms, such as loss of signal (LOS), loss of frame (LOF), alarm indication signal (AIS), threshold crossing alert (TCA), or the like) to the PLC 120, or the like, as well as various combinations thereof. The PNEs 120 may be configured to communicate with the NC 140 directly or indirectly via the PLC 120 based on various control protocols. For example, the PNEs 112 may be routers, switches, or the like.

The ONEs 113 are optical network elements configured to support optical layer communications within the MLN 110. The ONEs 113 include various ports, including ports which may be connected to ports of respective PNEs 112 via respective CLLs 114 as depicted in FIG. 1. The ports of the ONEs 113 may be denoted as ONE ports of the ONEs 113, and also may be referred to as ports of the ONE 113 or optical ports of the ONE 113 where the term "optical port" may refer to the port being part of the ONE 113 rather than referring to the connection type supported by the port. The ONEs 113 also include ONE ports that may be connected to other ONEs 113, e.g. via OLs 119, as depicted in FIG. 1. The ONEs 113 are configured to support port control functions (e.g., activating and deactivating ports), port monitoring functions (e.g., activity detection on the ports, alarm monitoring and detection on the ports, or the like), or the like, as well as various combinations thereof. The ONEs 113 are configured to be communicated with remotely via one or more management channels for element management, configuration, control, and information. The ONEs 113 are configured to communicate with the OLC 130, based on various control protocols as discussed further below, such that the OLC 130 may control the ONEs 113, the ONEs 113 may provide acknowledgments (e.g., acknowledging execution of commands) to the OLC 130, the ONEs 113 may report events (e.g., alarms, such as alarms indicative that the received optical signal power is out of range (e.g., LOS, TCA, or the like) to the OLC 130, or the like, as well as various combinations thereof. The ONEs 130 may be configured to communicate with the NC 140 directly or indirectly via the OLC 130 based on various control protocols. For example, the ONEs 113 may include reconfigurable optical add-drop multiplexers (ROADMs), optical switches (OSs), optical cross-connect (OXC) devices, or the like. It will be appreciated that each of the ONEs 113 may use electronic switching, optical switching, or a combination of electronic and optical switching. It will be appreciated that, while direct monitoring of ONE ports may not be possible on OXCs, indirect activity detection techniques may be used.

The CLLs 114 interconnect PNE ports on PNEs 112 and ONE ports on ONEs 113 (where a given CLL 114 interconnects a PNE port and an ONE port at a site). The CLLs 114 may be electrical or optical in nature. For example, electrical-based CLLs 114 may be high-speed Ethernet connections or OTN signals terminated on the PNE 112 (e.g., router or other suitable type of PNE 112). For example, optical-based CLLs 114 may include any format of digital signal (Ethernet, OTN, or the like) that is connected to the PNE 112 optically and that remain optical in ONE 113 (i.e., the digital signals are not converted from optical to electrical within the optical device before being groomed and transmitting optically to the network). If the signal is converted, then we consider it to be an electrical signal here since various fields of the digital signal could be accessed, if needed, to identify the sending ports. For example, optical-based CLLs 114 may include CLLs 114 in which the PNEs 112 (e.g., routers or switches) are connected to ONEs 113 having an all-optical switching fabric (e.g., an optical crossconnect (OXC) or micro-electromechanical switch (MEMS)). It is noted that the CLLs 114 are assumed to occur only between PNEs 112 and ONEs 113 that are geographically co-located.

It will be appreciated that, although primarily presented with respect to an arrangement in which each network site includes a single NN 111, each network site may include one or more NNs 111 (and, thus, one or more PNEs 112, one or more ONEs 113, one or more sets of CLs 114, or the like, as well as various combinations thereof).

It will be appreciated that, although primarily presented with respect to specific configurations of cross-layer NNs 111 or network sites (namely, a 1:1 arrangement in which a given cross-layer NN 111 or network site includes a single PNE 112 and a single ONE 113), one or more cross-layer NNs 111 or network sites may have a different arrangement, such as one or more of a 1:N arrangement in which CLLs 114 are used to interconnect a single PNE 112 to multiple ONEs 113 at the NN 111 or network site, a N:1 arrangement in which CLLs 114 are used to interconnect multiple PNEs 112 to a single ONE 113, a N:N arrangement in which CLLs are used to interconnect multiple PNEs 112 to multiple ONEs 113 (e.g., a network site having two routers and two ROADMs, where there are CLLs 114 between each router and both ROADMs), or various combinations thereof.

It will be appreciated that the MLN 110, although primarily presented with respect to specific numbers, types, and arrangements of NNs 111 (and associated PNEs 112, ONEs 113, and CLLs 114) and OLs 119, may be configured to use various other numbers, types, or arrangements of NNs 111 (and associated PNEs 112, ONEs 113, and CLLs 114) and OLs 119.

It will be appreciated that the MLN 110 may include various other numbers, types, or arrangements of sites, elements, or the like, as well as various combinations thereof.

The MLN 110, as illustrated in FIG. 1, may be controlled based on various control elements (illustratively, PLC 120 for the packet layer, OLC 130 for the optical layer, and NC 140 for overall network control). The control elements may include Element Management Systems (EMSs), Network Management Systems (NMSs), or the like. The control elements may be based on various control capabilities (e.g., operation as EMSs and NMSs, use of the Operations Management System (OMS), or the like, as well as various combinations thereof). The control elements may be configured to support various control protocols for use in controlling elements of MLN 110, such as the Common Management Information Protocol (CMIP), the Simple Network Management Protocol (SNMP), Transaction Language One (TL1), Hypertext Transfer Protocol (HTTP), Openflow, NetConf, Common Object Request Broker Architecture (CORBA) General Inter-ORB Protocol (GIOP)/Internet Inter-ORB Protocol (IIOP), Topology and Orchestration Specification for Cloud Applications (TOSCA), or the like, as well as various combinations thereof. The control elements may include or have associated therewith databases (DBs)/management information bases (MIBs) for storing information related to the control functions provided by the control element (e.g., hardware location, hardware configuration details, card characteristics, assigned port identifiers, or the like, as well as various combinations thereof). The operation of PLC 120, OLC 130, and NC 140 is discussed further below.

The PLC 120 is configured to provide control functions at the packet layer of MLN 110. The PLC 120 is configured to provide control functions for the PNEs 112 of MLN 110. For example, the control functions may include provisioning, management, monitoring, or the like, as well as various combinations thereof. The PLC 120 may be configured to provide control functions for the PNEs 112 under the control of or based on interaction with the NC 140. The PLC 120 may be configured to provide various functions for supporting cross-layer link discovery for discovery of CLLs 114 of MLN 110. The PLC 120 may be implemented in various ways (e.g., as an EMS, based on the OMS, or the like, as well as various combinations thereof). The PLC 120 has a packet layer DB/MIB 121 associated therewith, which may store various types of information for PLC 120 (e.g., information which PLC 120 may use to provide control functions at the packet layer of MLN 110, information determined by PLC 120 based on providing control functions at the packet layer of MLN 110, information discovered by the PLC 120 in conjunction with supporting cross-layer link discovery for discovery of CLLs 114 of MLN 110, or the like, as well as various combinations thereof). The PLC 120 may be configured to support various other packet-related control functions for MLN 110.

The OLC 130 is configured to provide control functions at the optical layer of MLN 110. The OLC 130 is configured to provide control functions for the optical elements of MLN 110 (e.g., the optical NNs 111, the ONEs 113, and the like). For example, the control functions may include provisioning, management, monitoring, or the like, as well as various combinations thereof. The OLC 130 may be configured to provide control functions for the optical elements of MLN 110 under the control of or based on interaction with the NC 140. The OLC 130 may be configured to provide various functions for supporting cross-layer link discovery for discovery of CLLs 114 of MLN 110. The OLC 130 may be implemented in various ways (e.g., as an EMS, based on the OMS, or the like, as well as various combinations thereof). The OLC 130 has an optical layer DB/MIB 131 associated therewith, which may store various types of information for OLC 130 (e.g., information which OLC 130 may use to provide control functions at the optical layer of MLN 110, information determined by OLC 130 based on providing control functions at the optical layer of MLN 110, information discovered by the OLC 130 in conjunction with supporting cross-layer link discovery for discovery of CLLs 114 of MLN 110, or the like, as well as various combinations thereof). The OLC 130 may be configured to support various other optical-related control functions for MLN 110.

The NC 140 is configured to provide network control functions for the NNs 111 of MLN 110. For example, the network control functions may include provisioning, management, monitoring, or the like, as well as various combinations thereof. The NC 140 may be configured to provide network control functions for the MLN 110 directly, based on control of or interaction with other control elements (illustratively, PLC 120 and OLC 130), or the like, as well as various combinations thereof. The NC 140 may be configured to provide various functions for supporting cross-layer link discovery for discovery of CLLs 114 of MLN 110 (embodiments of which are presented with respect to FIG. 2 and FIG. 3). The NC 140 may be implemented in various ways (e.g., as an NMS, based on the OMS (e.g., as an OMS application host), as a system or device configured to interface to separate packet and optical management systems, or the like, as well as various combinations thereof). The NC 140 has an network DB/MIB 141 associated therewith, which may store various types of information for NC 140 (e.g., information which NC 140 may use to provide control functions for the MLN 110, information determined by NC 140 based on providing control functions for the MLN 110, information discovered by the NC 140 in conjunction with supporting cross-layer link discovery for discovery of CLLs 114 of MLN 110, or the like, as well as various combinations thereof). The NC 140 may be configured to support various other network control functions for MLN 110.

The communication system 100 is configured to support a cross-layer link discovery capability that may provide support automated and reliable discovery of CLLs at network nodes of a communication network (illustratively, discovery of CLLs 114 of certain NNs 111 of MLN 110). The CLLs 114 are links between PNE ports of PNEs 112 and ONE ports of ONEs 113 at NNs 111, respectively. The CLLs 114 may be discovered by discovering correlations between the port pairs (PNE port-ONE port pairs) connecting the CLLs 114 (namely, at a given NN 111, a given CLL 114 connects a PNE port of the PNE 112 at the given NN 111 and an ONE port of the ONE 113 at the given NN 111 such that discovery of a correlation or match between the PNE port of the PNE 112 at the given NN 111 and the ONE port of the ONE 113 at the given NN 111 provides discovery of the given CLL 114 that interconnects those ports). Accordingly, communication system 100 may be configured to support discovery of CLLs 114 of NNs 111 of the MLN 110 based on port matching techniques (e.g., port classification, port isolation, or the like, as well as various combinations thereof), which may be further understood by way of reference to the example process of FIG. 2.

The communication system 100 is configured to support a cross-layer link discovery capability that is configured to support automated and reliable discovery of CLLs at network nodes of a communication network (illustratively, discovery of CLLs 114 of certain NNs 111 of MLN 110). The CLL discovery process, in at least some embodiments, may be considered to be a "divide and conquer" solution in that it provides a systematic reduction of potential connections into increasingly smaller candidate subsets, until the packet-optical connection ambiguities can be resolved. Leveraging possibly-separated packet and optical layer network databases (e.g., MIBs), the CLL discovery process performs analytics on data about the packet and optical devices at network nodes and, if necessary, selective intelligent probing of the ports, to develop information for unambiguously identifying packet device port/optical device port interconnections. There are two general classes of probing techniques that may be employed: active and passive. The active probing techniques may involve making disruptive changes (e.g., to traffic, transmitted signals, routes, or the like) in ports of one of the NEs to generate detectable system or element responses by an interconnected NE. For example, the power level could be reduced on the network-facing ports of a router to generate optical EMS LOS alerts or TCAs. The passive probing techniques may involve obtaining and analyzing system configuration, performance, or other data without interfering with any services. For example, byte or event/condition counts for ports on appropriate sides of a connection, or signal presence indicators can be used to detect presence or absence of traffic on PNE ports and ONE ports. The passive probing techniques may involve traffic migrations or injections. It is noted that both passive and active probing techniques may be used to collect training data for analytics. The operational state of the network or devices may impact the manner in which the probing techniques are employed. For example, for pre-operational/non-operational equipage, active techniques may be used to guarantee results more quickly and with less effort while passive probing techniques may be used as an independent validation to remove ambiguities, whereas in operational networks and/or devices there may be a greater reliance on passive techniques in order to minimize disruptions with active probing techniques potentially being used to resolve ambiguities or improve likelihood of any matching results.

Figure 2:
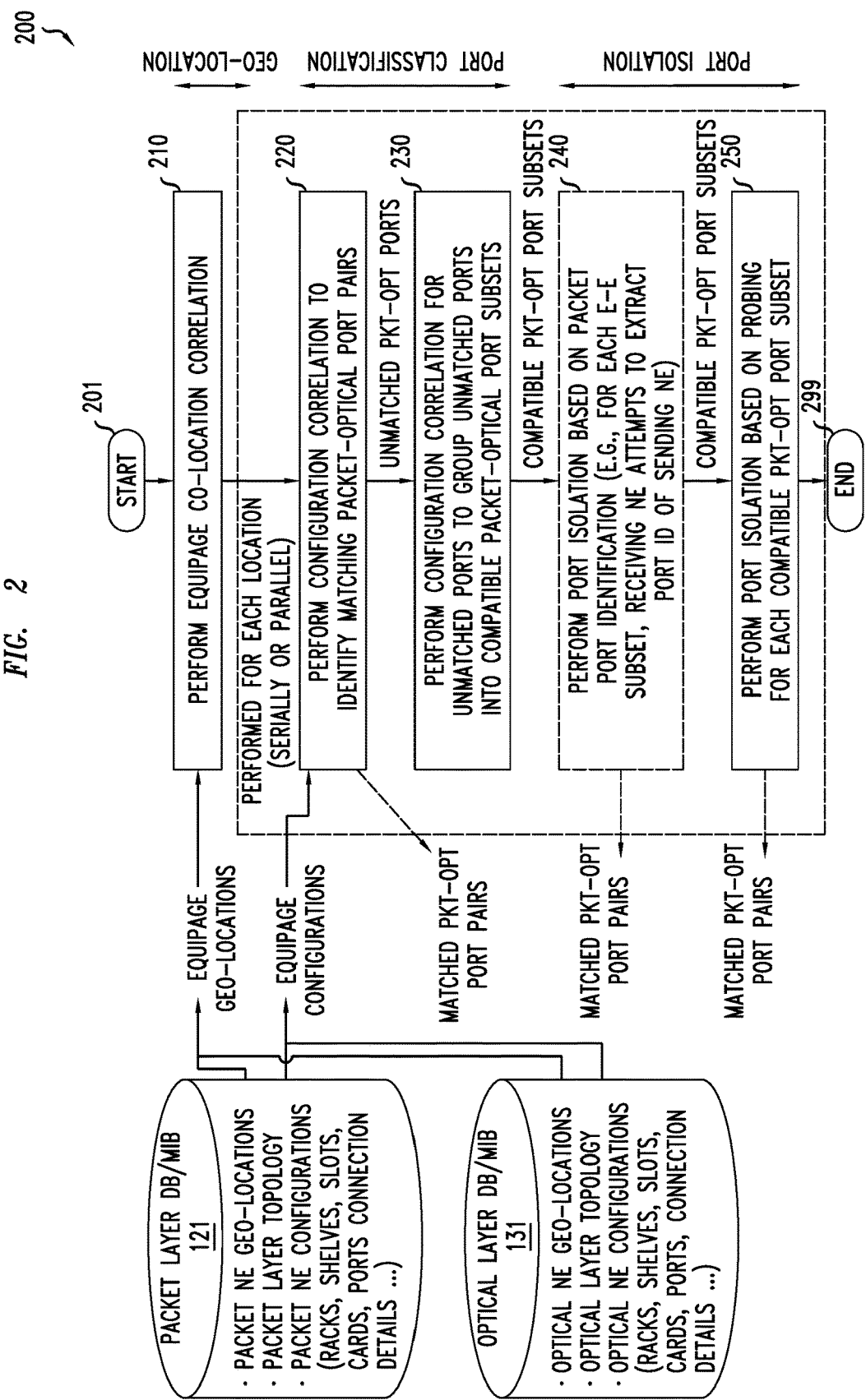
FIG. 2 depicts an example process, within the context of a portion of the example communication system of FIG. 1, configured to support discovery of cross-layer links at network nodes of a communication network based on correlation processing and port isolation.

FIG. 2 depicts an example process, within the context of a portion of the example communication system of FIG. 1, configured to support discovery of cross-layer links at network nodes of a communication network based on correlation processing and port isolation. The method 200 may be executed by the NC 140 of FIG. 1. It is noted that at least some of the functions of method 200, although presented in FIG. 2 as being performed serially, may be performed contemporaneously or in a different order than as presented in FIG. 2.

At block 201, method 200 begins.

At block 210, equipage co-location correlation is performed. It will be appreciated that, given that a CLL is a link at a given NN between a PNE port of a PNE and an ONE port of an ONE, only those ports located at the same location are expected to be able to be connected via a given CLL. Here, the location may be considered to be a geographic location, which may be measured at any suitable level of granularity (e.g., by site where multiple sites are geographically distributed, by internal location where equipage is located at multiple locations within a building (e.g., by floor, rack, bay, or the like), or the like, as well as various combinations thereof. The equipage co-location correlation may be performed based on equipage geo-location information which, as depicted in FIG. 2, may be include PNE geo-location information for PNEs that is available from the packet layer DB/MIB 131 for PNE ports and ONE geo-location information for ONEs that is available from the optical layer DB/MIB 131 for ONE ports (either or both of which, although not depicted in FIG. 2, also or alternatively may be available from the network DB/MIB 141). For example, the equipage geo-location information may include one or more of physical site facility names, street addresses, geographic coordinates, or the like, as well as various combinations thereof. The equipage co-location correlation may result in one or more sets of geo-correlated ports (e.g., one set of geo-correlated ports for each geographic location at which relevant ports are identified). The one or more sets of geo-correlated ports each may be further analyzed (serially or in parallel), based on various port matching techniques, to identify matching port pairs (PNE port-ONE port pairs) determined to be endpoints of respective CLLs (i.e., the blocks 220-250 discussed further below, which provide port matching techniques for identifying matching port pairs, may be performed for each set of geo-correlated ports and, thus, also may be considered to be performed for each site or location). It is noted that, although primarily presented with respect to embodiments in which each site is processed independently of other sites, there may be cases in which sites are coupled or related in some manner (in which case their interdependency may be addressed by appropriate ordering of the sites and processing of the sites based on that ordering).

In general, the blocks 220-230 discussed further below relate to use of port classification techniques to identify matching port pairs (P-O port pairs) determined to be endpoints of respective CLLs. From the DBs/MIBs, the possible interconnection ports associated with each piece of site equipment are obtained, along with attributes associated with the ports, such as port type, unique port identifier, signal protocol, signal rate, assigned wavelength (if any), modulation, polarization, and the like. Based on this information, ports at a site for each layer are grouped into mutually compatible types, i.e., ports in one layer (e.g., packet) that could be candidates for connection to a given port of the other layer (e.g., optical). The compatibility of ports may be based on the connection types supported by the ports (e.g., electrical versus optical). For large sites with many ports, an efficient data classifier for objects with discrete characteristics is suitable, especially since the space of port types is limited and well known. This allows for preconstruction of a classification model which can also accommodate learning for any new port types. For smaller sites, pair-wise comparison between the set of PNE ports and ONE ports may be sufficient to define port groups in both layers.

In at least some embodiments, port classification may include classification of PNE ports and ONE ports into three types of mutually compatible P-O port groups as follows: (I) groups of unit size; (II) groups, of size at least two, of electrical connections (i.e., electrical-to-electrical (E-E) links between the PNE and the ONE); and (III) groups, of size at least two, of optical connections (E-O or E/O-O links between the PNE and the ONE).

A Type I port group includes one PNE port and one ONE port, which represent terminations of a CLL therebetween. The ports can terminate either electrical or optical connections and have sufficient configuration information to uniquely associate them with each other. As a result, the ports in each such group can be considered as matched and removed from further consideration after the corresponding cross-layer link information is saved.

A Type II port group represents PNE ports and ONE ports connected electrically in some manner (namely, via E-E links between the PNE and the ONE. The manner in which the PNE port and ONE ports are connected could be determined by digital-only means, since the signal transmitted over the CLL is sent and received in a digital electronic format. In this case, the sending device can insert a unique port identifier of the sending port in some field of the digital signal and the receiving device can extract that field of the digital signal in order to obtain the unique port identifier of the sending port and, thus, match the sending port to the receiving port. However, in order to support this type of capability, the sending and receiving devices will have to agree on which field(s) of the digital signal are to be used to transport the port identifier information (which may be complicated by the fact that different signal formats (e.g., Ethernet and Optical Transport Network (OTN) may transport the port identifier information in different locations), both the sending and receiving devices will need access to the electronic signal (which may require the introduction of additional digital signal processing (DSP) chips on the receiving device), and so forth. While this type of digital extraction processing could be performed, this step is optional (as indicated at block 240) since the port isolation process (presented in block 250) may be used to determine the connections for the Type II port group without having to resort to the digital extraction processing as discussed above (and, thus, obviating the need for agreement on the field of the digital signal in which the port ID is communicated, obviating the need for additional DSP chips in the receiving device port cards, and so forth).

A Type III port group represents PNE ports and ONE ports connected optically in some manner without further electrical conversion by the optical NE. As a result, no port identifier can be stored or extracted on the optical side of the connection and, thus, port isolation based on port probing is applied in order to ascertain which PNE ports are connected to which ONE ports (and, thus, identify the CLLs therebetween).

At block 220, configuration correlation is performed for a given set of geo-correlated ports to attempt to identify matching port pairs (PNE port-ONE port pairs) determined to be endpoints of respective CLLs. The configuration correlation may be performed based on configuration information which, as depicted in FIG. 2, may include PNE configuration information for PNEs (e.g., racks, shelves, slots, cards, ports, or the like, as well as various combinations thereof) that is available from the packet layer DB/MIB 131 for PNE ports and ONE configuration information for ONEs (e.g., racks, shelves, slots, cards, ports, or the like, as well as various combinations thereof) that is available from the optical layer DB/MIB 131 for ONE ports (either or both of which, although not depicted in FIG. 2, also or alternatively may be available from the network DB/MIB 141). The configuration correlation may be performed based on attribute matching using the configuration information (e.g., matching attributes of PNE configuration information and attributes of the ONE configuration information to identify matching port pairs determined to be endpoints of respective CLLs). In at least some embodiments, at worst, a two-loop search may be performed to match attributes of the PNE configuration information and attributes of the ONE configuration information, such that the processing for configuration correlation may be on the order of approximately $O(N^2)$. As illustrated in FIG. 2, any matching port pairs that are identified are saved (these matching port pairs correspond to endpoints of discovered CLLs, such that additional processing is not required for discovery of those CLLs), whereas any remaining unmatched ports may be passed to block 230 for further analysis, based on port matching techniques (port classification and port isolation), to identify matching port pairs determined to be endpoints of respective CLLs.

At block 230, compatibility correlation is performed for the remaining unmatched ports of the given set of geo-correlated ports in order to group the remaining unmatched ports into compatible P-O port subsets. The compatibility correlation may be performed based on compatibility information, which may include various types of information which may be used in order to determine whether a PNE port and an ONE port are compatible with each other. For example, the compatibility information may include signal type, speed, color, or the like, as well as various combinations thereof. The compatibility correlation may result in one or more compatible P-O port subsets (e.g., each of which may include one or more PNE ports and one more ONE ports which, given the compatibility between them, could be further correlated as being endpoints of respective CLLs). The one or more compatible P-O port subsets each may be further analyzed (serially or in parallel), based on various port isolation techniques, to identify matching port pairs (PNE port-ONE port pairs) determined to be endpoints of respective CLLs. As illustrated in FIG. 2, the one or more compatible P-O port subsets may be passed to block 240 (optionally, such as when the compatible P-O port subset includes only E-E interconnections) and to block 250 (e.g., each compatible P-O port subset or those not processed at block 240) for further analysis, based on port isolation, to identify matching port pairs determined to be endpoints of respective CLLs.

In general, the blocks 240-250 discussed further below relate to use of port isolation techniques, including configuration based isolation and isolation based on probing, to identify matching port pairs (P-O port pairs) determined to be endpoints of respective CLLs. The port isolation techniques may be used to match P-O ports into CLL terminations for any ports in the Type II or Type III port groups. The processing of Type II port groups may be performed as described in block 240 (based on port identification) or as described in block 250 (based on port probing). The processing of Type III port groups may be performed as described in block 250 (based on port probing). The port probing can be active or passive, which may depend on whether or not it is disruptive to services using the ports. In general, active probing may involve (1) sending a port-specific device management command(s) to a first device (a packet-layer or optical-layer device) that will induce a port-specific device management alarm or alert to be generated by a second device (the corresponding interconnected layer device, either optical or packet), (2) receiving a command acknowledgment message from the first device(s), which results from issuance of the port-specific device management command(s) to the first device, (3) receiving the port-specific device management alarm or alert to be generated by the second device, and (4) performing correlation processing based on the various messages to identify matching port pairs (e.g., based on information of the various messages, such as port identifiers, timestamps, or the like). In general, passive probing may involve sending port-specific device management interrogatives to devices in both layers to retrieve port usage, performance, or state information that can be correlated in time and reply attributes in order to match ports. It is noted that passive probes do not induce a port state change in either layer. It is further noted that, provided it is not disruptive to a service, passive probing can also involve traffic migration or injection in order to create detectable changes in traffic patterns which may be correlated in order to identify port matches.

At block 240 (an optional block), port isolation based on PNE port identification may be performed. The port isolation based on PNE port identification may be performed for each compatible P-O port subset including E-E CLLs (namely, the Type II port groups discussed above). The port isolation based on PNE port identification for a compatible P-O port subset including E-E CLLs may be performed by, for each PNE port in the compatible P-O port subset, instructing the associated ONE that is associated with the PNE port (i.e., the ONE of the NN on which the PNE of that PNE port is located) to extract a PNE port identifier of the PNE port. The port isolation based on PNE port identification may be performed using extensions to the Ethernet Link Layer Discovery Protocol (LLDP), extensions to Optical Transport Network (OTN) Optical Transport Unit (OUT)/Optical Data Unit (ODU) fields, or the like, as well as various combinations thereof. It will be appreciated that the ports may need to be in the "UP" state (e.g. powered and functional) in order to perform port isolation based on PNE port identification. In at least some embodiments, at worst, a single-loop search may be performed on the ONE ports, for each PNE port, to attempt to identify an ONE port matching the PNE port, such that the processing for port isolation based on PNE port identification may be on the order of approximately O(N). As illustrated in FIG. 2, any matching port pairs that are identified are saved (these matching port pairs correspond to endpoints of discovered CLLs, such that additional processing is not required for discovery of those CLLs), whereas any remaining unmatched ports may be passed to block 250 for further analysis, based on port isolation techniques (e.g., active probing, passive probing, or a combination thereof), to identify matching port pairs determined to be endpoints of respective CLLs.

At block 250, port isolation based on probing may be performed for each compatible P-O port subset. The port isolation based on probing may be performed for each compatible P-O port subset including E-O or E/O-O CLLs (namely, Type III port groups). The port isolation based on probing also may be performed for each compatible P-O port subset including E-E CLLs (namely, the Type II port groups discussed above), such as where port isolation based on PNE port identification is not performed or does not successfully identify each port in a compatible P-O port subset including E-E CLLs. The port isolation based on probing enables identification of matching ports corresponding to endpoints of discovered CLLs. The port isolation based on probing may include active probing (e.g., at least some embodiments of which are presented with respect to FIGS. 3, 4, and 5). The port isolation based on probing may include passive probing. The port isolation based on passive probing may include port probing based on traffic migration (e.g., at least some embodiments of which are presented with respect to FIGS. 3, 6, and 7). The port isolation based on passive probing may include port probing based on traffic injection (e.g., at least some embodiments of which are presented with respect to FIGS. 3, 8, and 9). The port isolation based on probing may include various combinations of such probing types.

Figure 4:
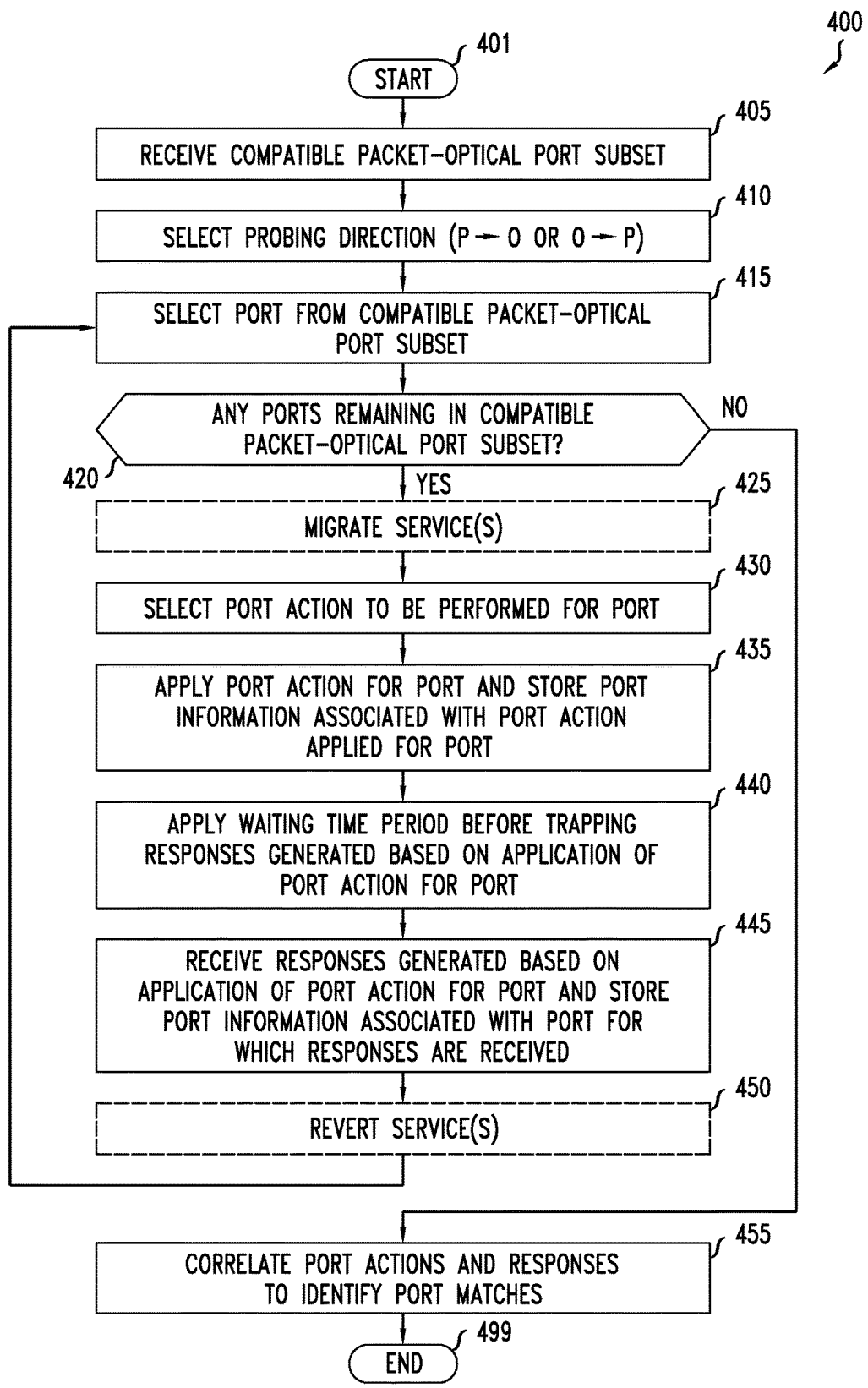
FIG. 4 depicts an example process for use by a network controller to support discovery of cross-layer links at network nodes of a communication network based on port isolation using active probing.
Figure 5:
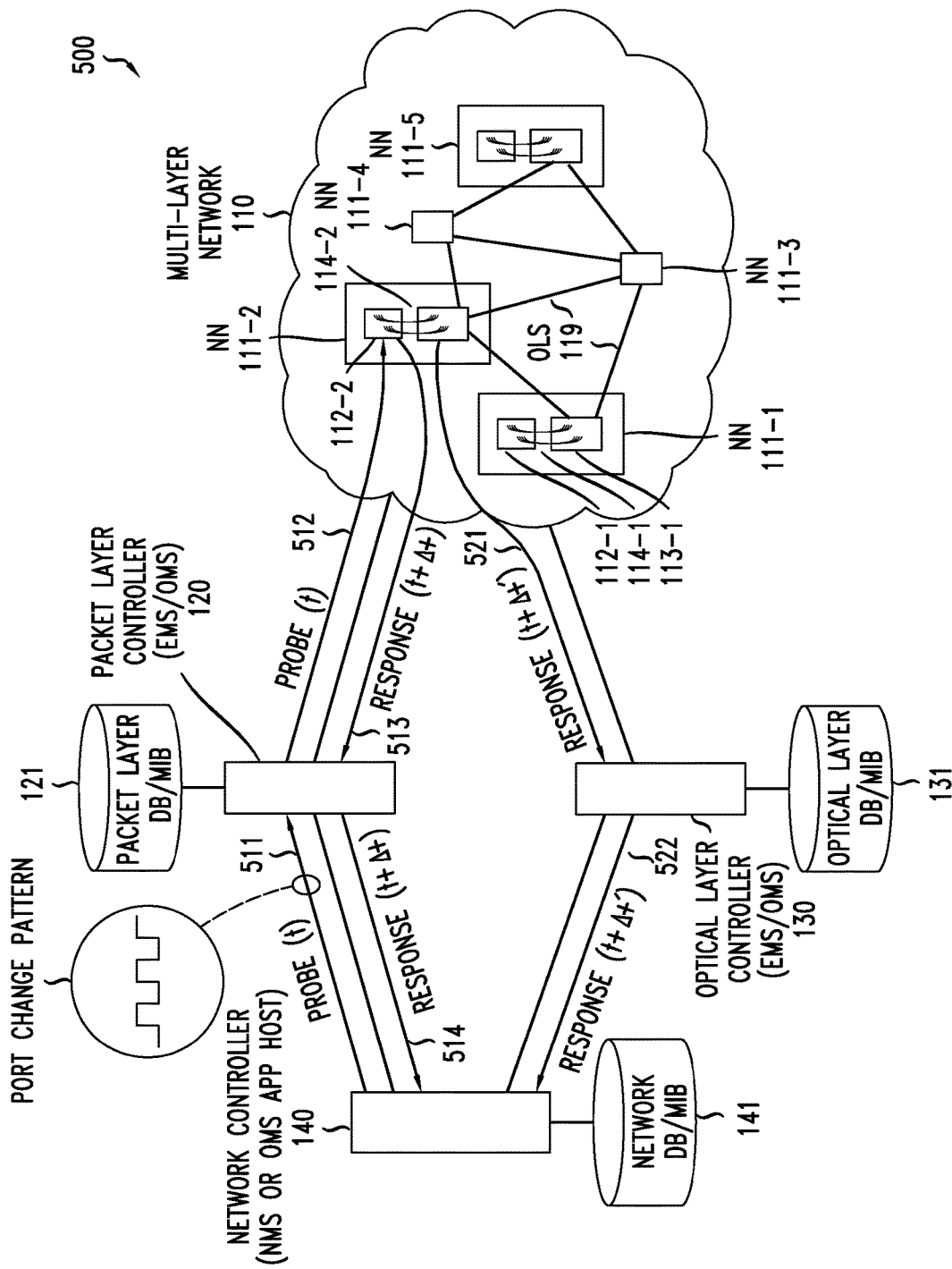
FIG. 5 depicts example messaging, within the context of the example communication system of FIG. 1 and associated with the example process of FIG. 4, for supporting discovery of cross-layer links at network nodes of a communication network based on port isolation using active probing.

The port isolation based on probing, as noted above, may include active probing. This type of probing may involve issuing a port-specific device management command to a packet-layer or optical-layer device that will induce a port-specific device management alarm, alert, advisory, notification, or the like. Such alarms usually are issued when a characteristic of a port changes, such as its state (e.g., ON, OFF, UP, DOWN, or the like), its power level (e.g., POWER DETECTED, NO POWER DETECTED, or the like), or the like. An example of active probing is illustrated in FIG. 5 for the packet-to-optical direction. The probing for a site may be initiated from a CLL discovery process application resident in or accessible to a controller or management system (e.g., NC 140). In order to initiate active probing, a CLL discovery process application may select a device and a port for which probing is to be performed and send associated probing commands to that device via its associated management system (e.g., EMS/OMS). These probing commands may result in response messages being returned from both the acting and reacting devices after a short time, which may be different for each device. The probing commands and response messages may be communicated in one of several standard protocols/languages used in the telecommunications industry for remote management of networking gear and machine-to-machine communications (e.g., TL1, SNMP, Openflow, NetCONF, HTTP, CORBA GIOP/IIOP, or the like). The communication format to use for a particular device may be determined either directly from the EMS in the form of device configuration information or, alternatively, by sending an inert (non-operations impacting) command requesting and learning the message type by classifying the message format. The probing commands and response messages are typically based on formats that include a timestamp (or, in the case of Openflow, it is included by the device and EMS in the XID field) and a device and port identifier of any event directly affecting a port, such as a state change, power level change, loss of signal, or the like. The port isolation process may be performed on each group of mutually compatible PNE ports and ONE ports that resulted from the classification processing. An example flow for the case of active probing is illustrated in FIG. 4. In at least some embodiments, active probing is applied to each port of a device only as necessary (e.g., not to the last unmatched pair of active router-ROADM ports). The direction of the active probing indicates on which side the active probing is initiated. If the probing is initiated on the PNE then the PNE is the acting device and the ONE is the reacting device (referred to as the "P→O" direction) and, vice versa, if the probe is initiated on the ONE then the ONE is the acting device and the PNE is the reacting device (referred to as the "O→P" direction). The probing process steps in one direction mirror that of the other direction, so both directions are covered by the process of FIG. 4 but only one direction (namely, P→O) is presented in the example of FIG. 5. Before probing begins, any critical services can be optionally migrated to other ports to avoid significant service disruption. In at least some embodiments of active probing, a port is selected, a port modulation pattern is then selected, and the device commands for the pattern are communicated by the CLL discovery process application to the PNE via its EMS. It is noted that generating a unique sequence of command events ensures that a detected response is attributable to the specific probe and, in at least some embodiments, the uniqueness can be reinforced using coding. After some delay, the command sequence in turn induces responses from the optical EMS, which should exhibit the same overall pattern as the probe command pattern, although the responses may not be one-for-one. For example, setting a router port state to DOWN could generate periodic LOS alarms on the ROADM until the alarm is cleared by setting the router port state back to UP. These time-stamped response messages are trapped and saved for subsequent analysis. Any services migrated can be optionally reverted to the original port after probing of the port is complete. After one or more ports have been probed and the corresponding event sequences generated, there are two response signals available in each probe time window that may be correlated to identify matching ports: (1) the pattern of acknowledgements from the active NE for each probe command sequence (2) and the pattern of responses induced on the reactive NE. These time-stamped responses are suitable for cross-correlation which, once successfully done, yields the identifier of the port responding to the port state changes (such that these two ports may be identified as being correlated in the sense that they are connected via a CLL). The cross-correlation of time-stamped information (e.g., the pattern of acknowledgements and pattern of responses) may be based on convolution or using other suitable cross-correlation techniques. In at least some embodiments, after probing of the compatible P-O port subset is completed in one probing direction, the process optionally may be performed in the other probing direction (e.g., for verification, if there is ambiguity to resolve, if network operational state is not a concern, or the like). In active probing, binary or non-binary port state modifications may be used. In general, in binary probes (e.g., port state modifications DOWN or UP), probe patterns include not only serial state changes, but also have fixed (or, optionally, distinctly varied) temporal interspacing of the state changes (e.g., inter-arrival time series) such that a cross-correlated response message pattern can be matched in either or both the state change series or the relative temporal interspacing of the state changes. In at least some embodiments, non-binary port state modifications may be used (e.g., with the push toward energy efficiency of networking equipment, port power may have more than two discrete adjustable levels and, thus, power level adjustments (higher or lower) combined with TCAs would suffice to generate an active probe response that could be cross-correlated without disrupting the service).

The port isolation based on probing, as noted above, may include passive probing. This type of probing may be employed to minimize in-service disruptions. It is noted that, even if active probing is ultimately employed to resolve ambiguities, use of passive probing first in an in-service network could produce CLL port matches, thereby reducing the number of ports requiring active probing. In general, passive probing is based on detecting similar traffic activity patterns on both sides of a CLL. The manner in which traffic activity is determined on a device may depend on the device type of the device (e.g., packet versus optical). For the PNE, determining traffic activity may be straightforward, because the traffic is in a digital format and packet devices commonly support byte counting of the traffic. For the ONE, determining traffic activity can be less straightforward, but a variety of techniques are available. For example, if the CLL is E-E or E/O-O/E, traffic activity on the ONE can be directly measured as byte counts on the optical side. For example, for all connection types, a small amount of light can be snooped and processed by a separate DSP to measure traffic activity (e.g., counting bytes) on the optical NE. For example, traffic activity on the ONE may be determined by measuring received power level and associating the measured received power level with some level of traffic. It is noted that the measurement of the received power level at the ONE may be performed on the client side of the ONE, because optical connections there are usually, at least currently, monochromatic and typically do not have the more strenuous optical engineering requirements encountered on the line side (e.g., tune power levels per wavelength, signal/traffic level maintenance, and the like).

It is noted that, however determined, the traffic activity that does get detected can be either unforced traffic activity (meaning that the traffic activity is already present on a port at the beginning of the discovery process, typically due to a service, and no changes are intentionally made to it, although it may change on its own) or forced traffic activity (meaning that the traffic activity present on a port is intentionally changed). The two main techniques which may be used for changing traffic on a port are traffic migration and traffic injection.

Figure 6:
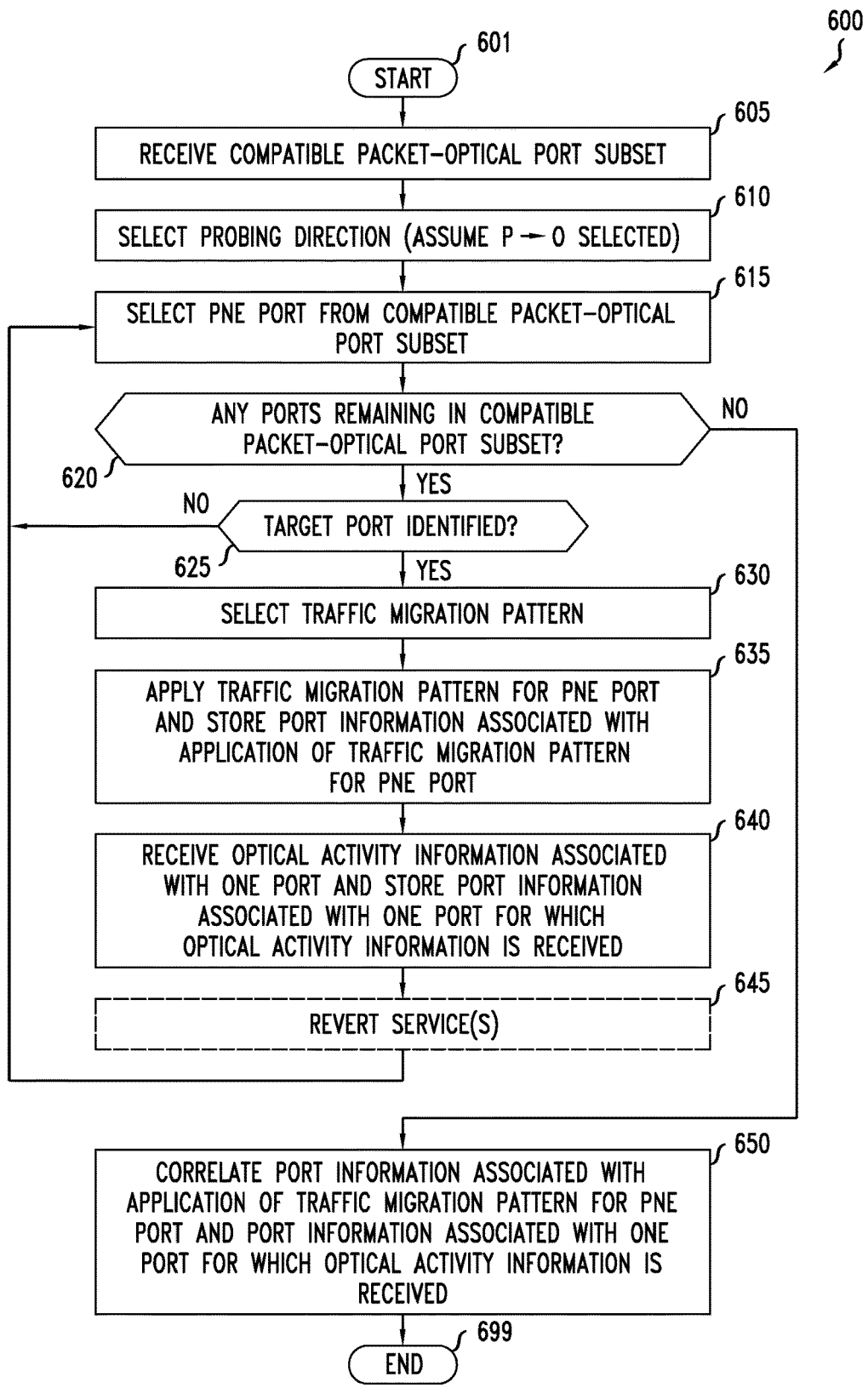
FIG. 6 depicts an example process for use by a network controller to support discovery of cross-layer links at network nodes of a communication network based on port isolation using passive probing based on traffic migration probing.
Figure 7:
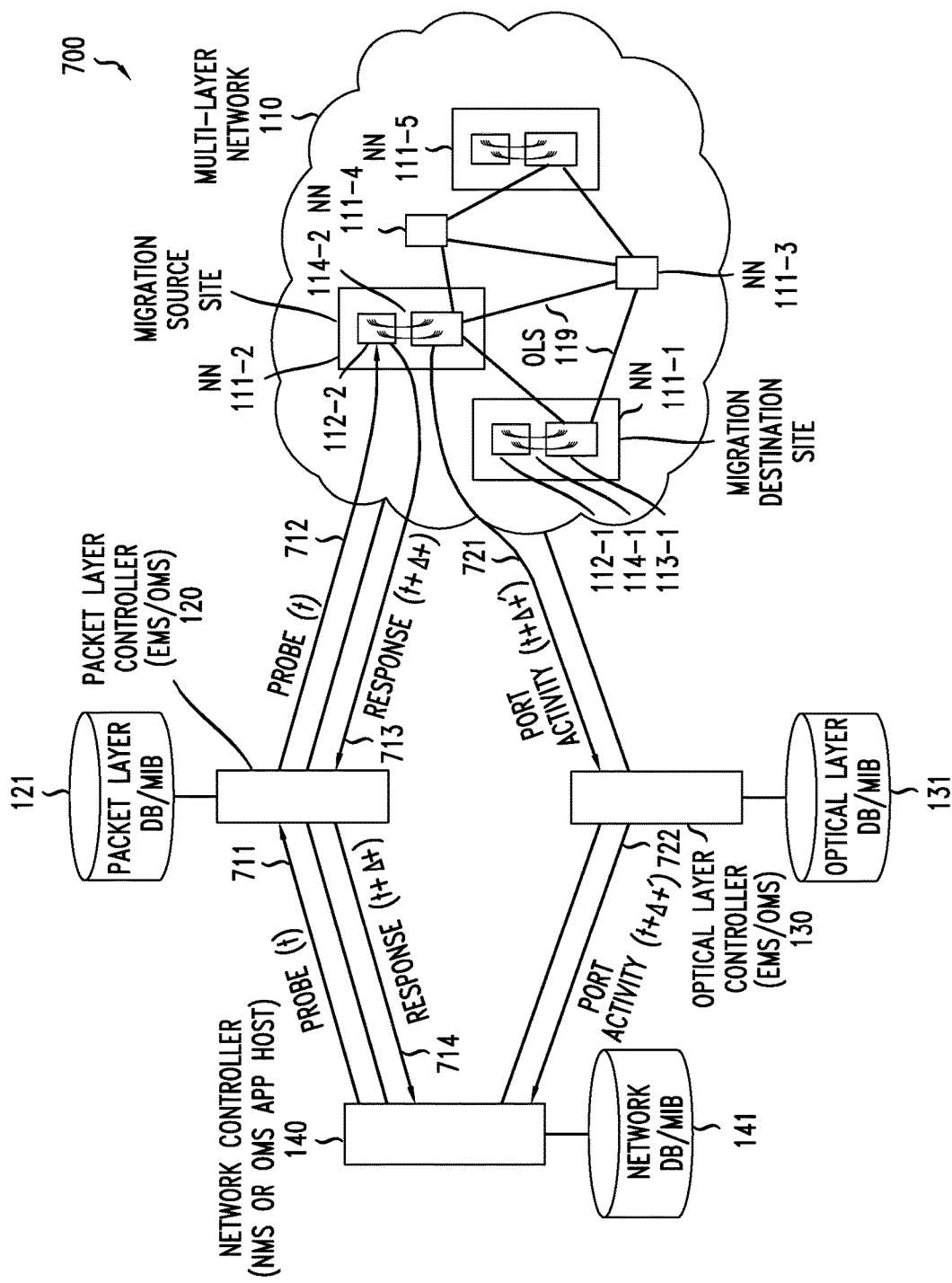
FIG. 7 depicts example messaging, within the context of the example communication system of FIG. 1 and associated with the example process of FIG. 6, for supporting discovery of cross-layer links at network nodes of a communication network based on port isolation using passive probing based on traffic migration probing.

The port isolation based on probing, as noted above, may include passive probing based on traffic migration (which also may be referred to herein as service migration). In general, service migration involves temporarily moving some or all of the services from one PNE port over to one or more alternative ports on the same PNE. The alternative ports may be referred to as target ports of a service migration. This typically requires sufficient residual capacity on the target ports to accommodate the migrated services and, further, the target ports need to be such that migrating services to them will allow the services to reach their destinations (e.g., be part of the same VLAN, or service forwarding using a FIB or LFIB). In general, to make this worthwhile, the migrated services also need to have a suitable size (e.g., data rate or bandwidth) to ensure that moving services will result in traffic activity changes on the original and target ports on both NEs that are sufficiently detectable for correlation purposes. An example of passive probing based on service migration is illustrated in FIG. 7 for the packet-to-optical direction. The probing for a site may be initiated from a CLL discovery process application resident in or accessible to a controller or management system (e.g., NC 140). The CLL discovery process application may select a PNE port to probe at a site and may select suitable target PNE ports that will result in the migrated service reaching its destination so that the service is not disrupted. The PNE port to probe at the site may be referred to herein as the source site, although it is noted that the site may not necessarily be the source of the service, but, rather, just on its route so that the service moves from the packet to optical domain at the so-called source site. It is noted that there may be more than one target port; however, for simplicity of exposition, only a single target port is described here. The CLL discovery process application also may select a service migration pattern. The migration pattern may be a series of migrations, back and forth between the original port and the target port, suitably spaced in time so that the pattern is detectable. In at least some embodiments, coding can be employed to improve signal reliability as well as allowing the migration pattern to be uniquely association with the port being probed. The CLL discovery process application, after selecting the migration pattern, sends a series of migration commands to the PNE via its EMS. This results in two types of signals being generated: (1) a series of time-stamped responses from the PNE that acknowledge execution of the migration commands and (2) a set of time series giving the traffic activity for each client port on the ONE, which can be harvested via the optical EMS. These constitute two signal sets that can be correlated with themselves and the original probe pattern, which itself is a time-ordered series. If the traffic activity changes in each ONE port are significant enough, the changes will be detectable, thereby allowing the signals to be correlated and the corresponding ONE port to be identified. The cross-correlation of time-stamped information (e.g., the original probe pattern, the series of time-stamped responses from the PNE that acknowledge execution of the traffic migration commands, and the time-stamped traffic activity for the ports on the ONE) may be based on convolution or using other suitable cross-correlation techniques. It is noted that the service migration at the source site may also induce traffic activity changes in CLLs at other sites, including transit sites en route to the destination site and the destination site, such that CLL-related port traffic activity at those sites could be harvested in order to provide information that can be cross-correlated in order to identify matching ports associated with CLLs at those sites (and, thus, identify the CLLs at those sites). It is further noted that it is possible that the service traffic migrated at the source site may be multiplexed together into one CLL at the destination site, in which case it is expected that no traffic activity fluctuations would be detected. However, if distinct crosslinks are used at the destination site, then detectable traffic variations could be used to match ports there as well, provided the traffic fluctuations are sufficiently large relative to the other traffic traversing those CLLs. (Recall that the traffic migration pattern may be chosen to make the source site port traffic activity changes detectable, which may or may not suffice for detectability on the destination crosslinks.) An example flow for the case of passive probing based on traffic migration, in the P→O probing direction, is illustrated in FIG. 6. It will be appreciated that, although primarily described with respect to performing traffic migration probing in the P→O probing direction, in at least some embodiments traffic migration probing may be performed in the opposite probing direction (namely, O→P). It is noted that, unlike the active probing process, the process for passive probing based on traffic migration is not symmetrical in the opposite (O→P) probing direction. In at least some embodiments, initiation of a traffic migration process from the optical side entails reconfiguring optical drops, which might entail a more significant multi-site reconfiguration of the optical layer to achieve the correct drops. This could be disruptive to services and also runs the risk of introducing optical power instabilities in the WDM layer. In at least some embodiments, in order to avoid this and other complications or potential complications, the O→P probing direction may be configured to support a command option for instructing, via the packet and optical EMSs, one or more non-source sites (e.g., one or more transit sites or the destination site) to harvest optical and packet crosslink port activity data for the duration of the source site migration probing. These data may be used for later correlation attempts and port matching at these non-source sites. Since the routing of the original and migrated services are known from the topology and network, all sites along the routes that use CLLs represent opportunities for port matching based on just the one source site port probe.

Figure 8:
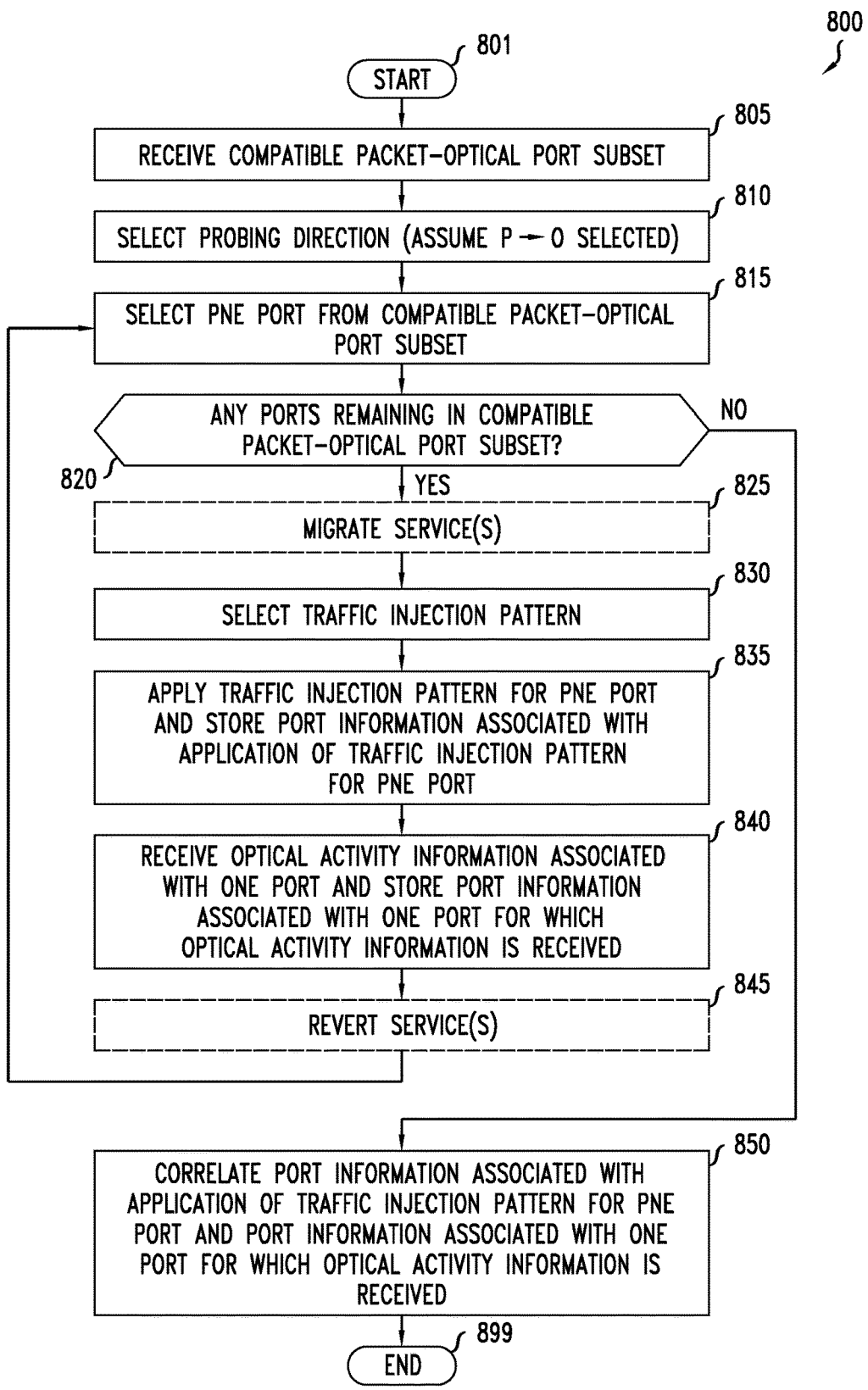
FIG. 8 depicts an example process for use by a network controller to support discovery of cross-layer links at network nodes of a communication network based on port isolation using passive probing based on traffic injection probing.
Figure 9:
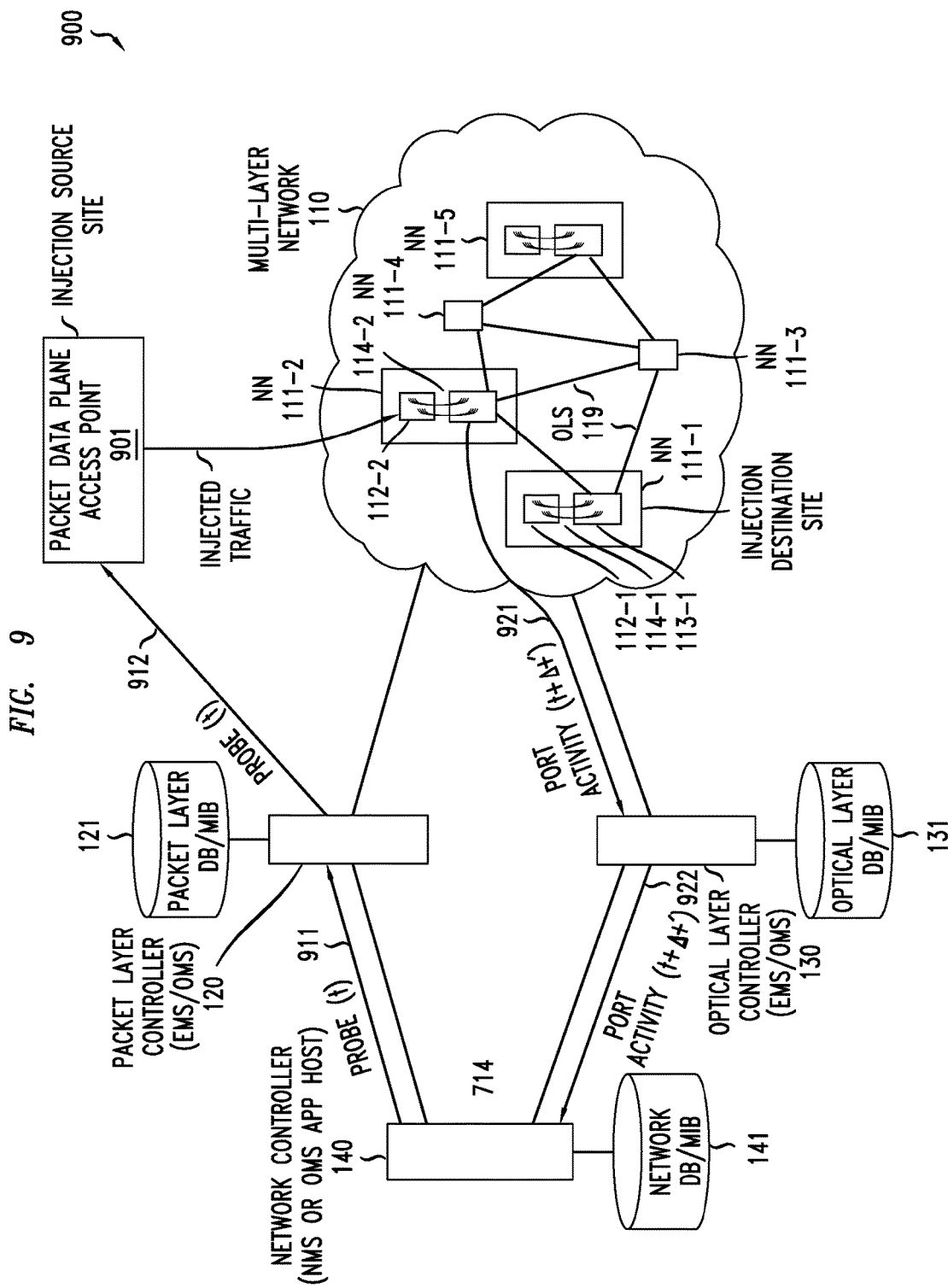
FIG. 9 depicts example messaging, within the context of the example communication system of FIG. 1 and associated with the example process of FIG. 8, for supporting discovery of cross-layer links at network nodes of a communication network based on port isolation using passive probing based on traffic injection probing.

The port isolation based on probing, as noted above, may include passive probing based on traffic injection. In at least some embodiments, traffic injection involves inserting traffic into the packet data plane in a controlled manner with sufficiently distinct temporal features for detection and correlation with ONE port activity. In particular, PNE port activity bursts can be patterned to produce distinctive features in the traffic activity time series, so that they can be correlated with ONE port activity if sufficient time granularity is available from the ONE port. An example of passive probing based on traffic injection is illustrated in FIG. 9 for the packet-to-optical direction. It is similar to traffic migration probing, with a difference being that the probes are customized traffic bursts inserted into the data plane such that the injected traffic traverses a PNE port at the site of interest. The probing for a site may be initiated from a CLL discovery process application resident in or accessible to a controller or management system (e.g., NC 140). An example flow for the case of passive probing based on traffic injection, in the P→O probing direction, is illustrated in FIG. 8. It is noted that one requirement for detectability on both sides of the CLL is to be able to inject a sufficiently large burst, which means the PNE port needs to have adequate residual capacity to do this. (If a selected PNE port does not, then services can be temporarily migrated away from it). It is further noted that CLL discovery can also be performed in low traffic periods. In combination with service migration, this would likely make finding migration targets ports easier with lower traffic loads. This can be automated with requests to the network resource management system in an SDN context. The CLL discovery process application, after selecting the injection pattern, sends traffic to a data plane access device for injection into the data plane or sends a series of injection commands to a device configured to control injection of traffic into the data plane (e.g., a packet EMS). This results in two types of signals being generated: (1) a series of time-stamped messages indicative that of injection of the traffic (e.g., messages indicative of traffic being injected or propagated for injection, responses from the PNE that acknowledge execution of the migration commands, or the like) and (2) a set of time series giving the traffic activity for each client port on the ONE, which can be harvested via the optical EMS. These constitute two signal sets that can be correlated with themselves and the original probe pattern, which itself is a time-ordered series. If the traffic activity changes in each ONE port are significant enough, the changes will be detectable, thereby allowing the signals to be correlated and the corresponding ONE port to be identified. The cross-correlation of time-stamped information (e.g., the original probe pattern, the series of time-stamped messages associated with the traffic injection, and the time-stamped traffic activity for the ports on the optical NE) may be based on convolution or using other suitable cross-correlation techniques. It will be appreciated that, although primarily described with respect to performing traffic injection probing in the P→O probing direction, in at least some embodiments traffic injection probing may be performed in the opposite probing direction (namely, O→P). In general, initiating in the opposite direction (O→P) requires being able to inject traffic into an optical device from the optical side and have it egress through the client side of the ONE and, similar to service migration probing, relies on detecting and correlating a crosslink signal at a destination site after it is injected into the data plane at a source site.

In at least some embodiments, in order to improve reliability of the correlation process for port isolation based on probing, coding may be used to specify the port actions to be performed for the port probing. For example, in the case of active probing, coding may be employed to help specify the serial state change patterns on the port. For example, HAM(8,4), or SECDED Hamming coding with 4 signal bits and 4 parity bits, when sent as 8 OFF-ON signals, is able to detect up to two errors in the transmitted probe pattern, thus allowing time correlation rejection of signals upon error detection and thereby flagging a need for a probe retry on a port. Similarly, for example, in the case of passive probing based on traffic migration, coding may be employed to help specify the sequence of traffic migration actions (or traffic fluctuations due to migration). Similarly, for example, in the case of passive probing based on traffic injection, coding may be employed to help specify the sequence of traffic migration actions (or traffic fluctuations due to migration). In at least some embodiments, coding may be used to improve the accuracy in distinguishing between port probings that are performed for multiple ports of a network element or network site concurrently. For example, this may be done by allowing for a unique association of a port probing pattern with a port that is being probed independent of the probing technique that is used such that, when seeking correlation of response signals, this uniqueness can be exploited to match ports.

It is noted that various vendor commonalities of the NN vendors may be exploited in order to support probing that enables identification of matching ports corresponding to endpoints of discovered CLLs, such as EMS messaging to/from devices and/or to/from NetOS/OMS/NMS over the management channels using standard machine-to-machine languages or protocols (e.g., SNMP, TL1, HTTP, CORBA GIOP/IIOP, Openflow, NetConf, and the like), generation and transmission of time-stamped messages (e.g., alarms, alerts, advisories, acknowledgments, or the like) by NEs when events (e.g., port state change, LOS, traffic activity changes, or the like) occur on the NEs, NE port activity monitoring and detection capabilities), or the like, as well as various combinations thereof.

As illustrated in FIG. 2, any matching port pairs that are identified are saved (these matching port pairs correspond to endpoints of discovered CLLs, such that additional processing is not required for discovery of those CLLs), whereas any remaining unmatched ports (there are not expected to be any) may be stored for further analysis in order to attempt to identify matching port pairs determined to be endpoints of respective CLLs.

It will be appreciated that, as noted above, blocks 220-250 may be repeated, serially or in parallel, for each set of geo-correlated ports identified at block 210.

At block 299, method 200 ends.

It will be appreciated that the output of the method 200 may be the matching port pairs determined (at blocks 220, 240, and 250) to be endpoints of respective CLLs, such that execution of the method 200 provides for discovery of the CLLs.

Figure 3:
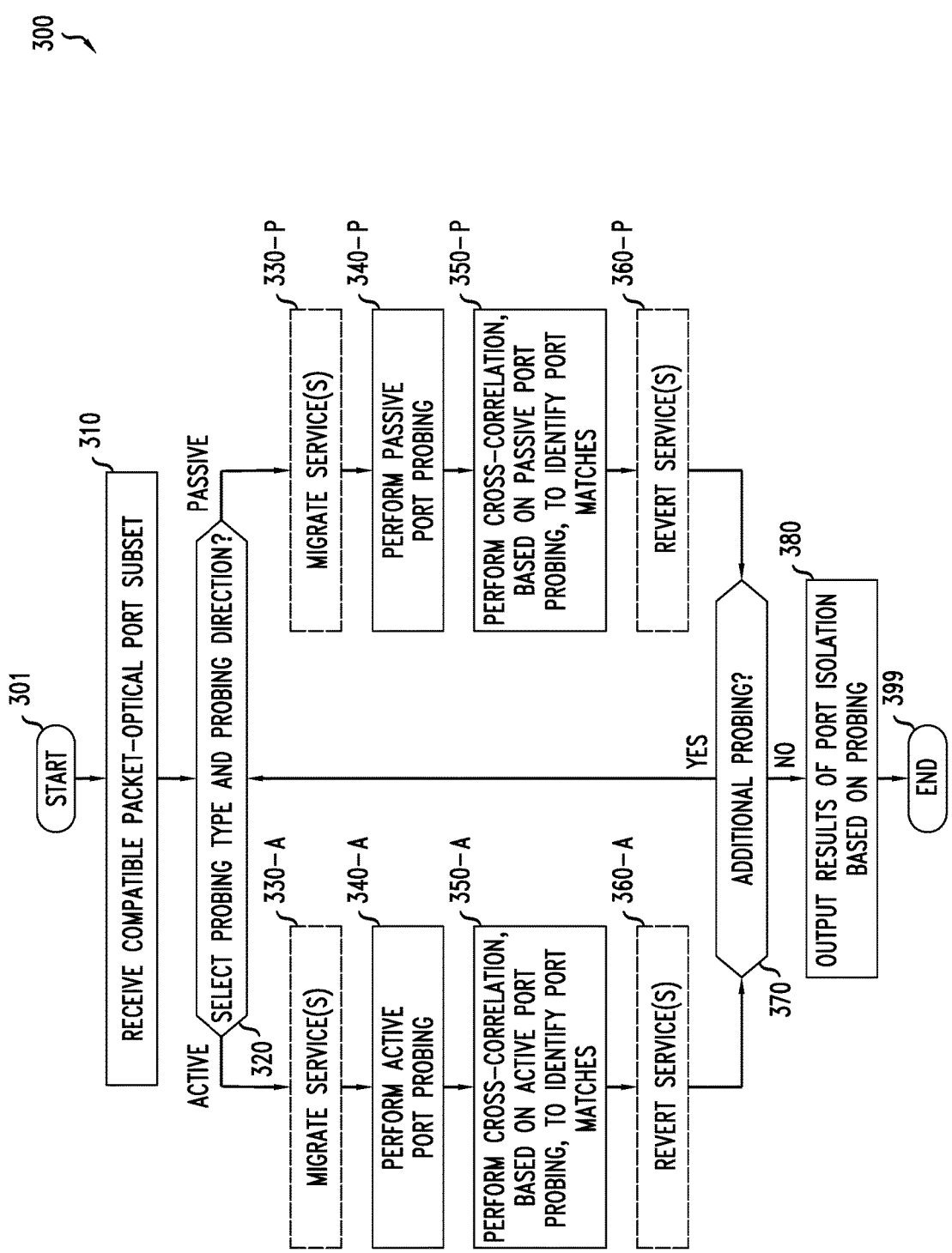
FIG. 3 depicts an example process configured to support discovery of cross-layer links at network nodes of a communication network using port isolation based on probing.

FIG. 3 depicts an example process configured to support discovery of cross-layer links at network nodes of a communication network using port isolation based on probing. The method 300 may be used to provide block 250 of method 200 of FIG. 2 (e.g., method 300 may be executed for each execution of block 250 of method 200 for the compatible P-O port subsets, respectively). The method 300 may be executed by the NC 140 of FIG. 1. It is noted that at least some of the functions of method 300, although presented in FIG. 3 as being performed serially, may be performed contemporaneously or in a different order than as presented in FIG. 3.

At block 301, method 300 begins.

At block 310, a compatible P-O port subset is received. The compatible P-O port subset includes one or more ports of a packet NE (denoted herein as a PNE) and one or more ports of an optical NE (denoted herein as an ONE). The compatible P-O port subset may be received based on execution of method 200 of FIG. 2.

At block 320, a port for which probing is to be performed, a probing type of the probing to be performed for the port, and a probing direction for the probing of the port are selected. The port is selected from the compatible P-O port subset. The probing type may be active probing or passive probing. It is noted that, for services in a pre-operational state, active probing may be used to guarantee results, whereas passive probing may be used to validate those results if necessary or desired (although either or both techniques may be used in various ways). It is noted that, for services in an operational state, passive probing may be used to minimize disruptions, whereas active probing may be used to resolve ambiguities in those results or to validate those results if necessary or desired (although, again, either or both techniques may be used in various ways). The probing direction may be in a direction from the PNE toward the ONE (denoted as P→O) or in a direction from the ONE toward the PNE (denoted as O→P).

If the probing type is active probing, the method 300 proceeds to block 330-A, and blocks 330-A, 340-A, 350-A, and 360-A are executed in order to perform active probing for identifying port matches in the compatible P-O port subset. At block 330-A, a service is optionally migrated before active probing is initiated. This may include a determination as to whether or not to migrate the service. The migration of the service may be initiated by NC 140 based on messaging to one or both of PLC 120 or OLC 130. At block 340-A, active port probing is performed. It is noted that active port probing may include performing a port change action for a port (e.g., making a change to one or more of a port state of a port, a signal traversing the port, a route associated with the port, or the like) in order to trigger the generation of a detectable system response that can be correlated with the port action performed for the port. For example, if active probing is performed in the P→O direction, the state or power of the PNE port may be changed in order to trigger generation of an optical LOS or TCA that will be reported to the OLC. At block 350-A, a port cross-correlation function is performed, based on the active port probing, to identify port matches (e.g., port change actions are correlated with responses to the port change actions (e.g., acknowledgments, alarms, alerts, or the like) in order to identity port matches). At block 360-A, the service is optionally reverted. This may include a determination as to whether or not to revert the service, which may be based on whether or not that service was previously migrated (e.g., if the service was previously migrated then the service is reverted). The reversion of the service may be initiated by NC 140 based on messaging to one or both of PLC 120 or OLC 130. From block 360-A, method 300 proceeds to block 370.

If the probing type is passive probing, the method 300 proceeds to block 330-P, and blocks 330-P, 340-P, 350-P, and 360-P are executed in order to perform passive probing for identifying port matches in the compatible P-O port subset. At block 330-P, a service is optionally migrated before passive probing is initiated. This may include a determination as to whether or not to migrate the service. The migration of the service may be initiated by the NC 140 based on messaging to one or both of the PLC 120 or the OLC 130. At block 340-P, passive port probing is performed. It is noted that passive port probing may include retrieval and analysis of traffic, system performance data, signals, or the like, as well as various combinations thereof. The passive port probing may be based on traffic migration, traffic injection, or the like. For example, passive probing may include collecting byte counts on both sides of a connection, identifying traffic patterns, or the like. At block 350-P, a port cross-correlation function is performed, based on the passive port probing, to identify port matches. At block 360-P, the service is optionally reverted. This may include a determination as to whether or not to revert the service, which may be based on whether or not that service was previously migrated (e.g., if the service was previously migrated then the service is reverted). The reversion of the service may be initiated by NC 140 based on messaging to one or both of PLC 120 or OLC 130. From block 360-P, method 300 proceeds to block 370.

At block 370, a determination is made as to whether or not additional probing is to be performed for the compatible P-O port subset (e.g., for the same port, for other ports not yet probed, for validation of previous results or port probing, or the like). If a determination is made that additional probing is to be performed for the compatible P-O port subset, method 300 returns to block 320, at which point a port, probing type, and probing direction are selected (any of which may be the same as or different than the previous pass through method 300). If a determination is made that additional probing is not to be performed for the compatible P-O port subset, method 300 proceeds to block 380.

At block 380, results of the port isolation based on probing are output. The results may be saved, provided to one or more systems, or the like, as well as various combinations thereof. The results of the port isolation based on probing may include matching port pairs that have been identified (these matching port pairs correspond to endpoints of discovered CLLs, such that additional processing is not required for discovery of the CLLs), identification of CLLs determined based on matching port pairs, identification of any ports for which matching port pairs were not identified based on the port isolation based on probing, or the like, as well as various combinations thereof.

At block 399, method 300 ends.

It will be appreciated that port isolation based on probing may be performed in various ways, at least some of which are presented with respect to FIGS. 4 and 5 (for active probing), FIGS. 6 and 7 (for passive probing based on traffic migration), and FIGS. 8 and 9 (for passive probing based on traffic injection).

FIG. 4 depicts an example process for use by a network controller to support discovery of cross-layer links at network nodes of a communication network based on port isolation using active probing. The method 400 is related to probing at a particular site (which, as discussed with respect to block 210 of FIG. 2, may be a location for which a compatible P-O port subset has been generated for analysis in identifying CLLs at the particular site). The method 400 may be executed by the NC 140 of FIG. 1. It is noted that the functions of method 400, although presented in FIG. 4 as being performed serially, may be performed contemporaneously or in a different order than as presented in FIG. 4.

At block 401, method 400 begins.

At block 405, a compatible P-O port subset is received. The compatible P-O port subset is associated with site (or location) currently being evaluated (i.e., active probing is performed at the site for identifying CLLs at the site). The compatible P-O port subset, as noted above, includes one or more ports of a PNE and one or more ports of an ONE. The compatible P-O port subset may be received based on execution of method 200 of FIG. 2.

At block 410, a probing direction is selected. The probing direction may be in a direction from the PNE toward the ONE (denoted as P→O) or in a direction from the ONE toward the PNE (denoted as O→P). The probing direction that is selected dictates the selection of ports from the compatible P-O port subset for evaluation and the manner in which evaluation is performed.

At block 415, a port is selected from the compatible P-O port subset. If the probing direction is P→O, the port that is selected is a PNE port. If the probing direction is O→P, the port that is selected is an ONE port.

At block 420, a determination is made as to whether any ports remain in the compatible P-O port subset. In a first pass through method 400, it is expected that at least one port will still remain in the compatible P-O port subset; however, as ports are selected and removed from the compatible P-O port subset, method 400 reaches a state in which no ports remain in the compatible P-O port subset. If a determination is made that at least one port still remains in the compatible P-O port subset, method 400 proceeds to block 425. If a determination is made that no ports remain in the compatible P-O port subset, method 400 proceeds to block 455.

At block 425, a service is optionally migrated. This may include a determination as to whether or not to migrate the service. The migration of the service may be initiated by the NC 140 based on messaging to one or both of the PLC 120 or the OLC 130.

At block 430, a port action to be performed for the port is selected. The port action to be performed for the port may be configured to trigger the generation of a detectable system response that can be correlated with the port action performed for the port. The port action to be performed for the port may include making a change to one or more of a port state of the port (e.g., changing the port between UP and DOWN states), a port power level of the port (e.g., modulating port power level of the port), a signal traversing the port, a route associated with the port, or the like, as well as various combinations thereof. The port action may be based on a port modulation pattern, such as a port state modulation pattern (e.g., alternately switching between UP and DOWN states with a specific timing), a port power modulation pattern (e.g., alternately decreasing and increasing the port power using predetermined power levels, predetermined timing of changed, or the like, as well as various combinations thereof), or the like. It will be appreciated that the port modulation pattern may include an even number of port power changes such that, at the end of the port modulation pattern, the port is ultimately in the same state as at the start of the port modulation pattern.

At block 435, the port action for the port is applied. The application of the port action for the port may be applied based on initiation of the port action by a controller and execution of the port action by the NE on which the port is located (e.g., initiated by the NC 140 based on messaging to the management system associated with the NE on which the port is located, which in turn controls execution of the port action by the NE on which the port is located). The port action may be applied based on port action control information that is provided to the NE on which the port is located (e.g., instructions, port action control information such as a port modulation pattern or the like, or the like, as well as various combinations thereof). Additionally, port information, associated with port action for the port selected from the compatible P-O port subset, is stored for later use in cross-correlation processing for the port. The port information may include any information suitable for use in cross-correlation processing (e.g., a port ID of the port, timestamp data related to application of the port action for the port, or the like, as well as various combinations thereof). If the probing direction is P→O, the port for which the port action is applied and for which the port information is saved is a PNE port (e.g., based on messaging with PLC 120, as presented in FIG. 5). If the probing direction is O→P, the port for which the port action is applied and for which the port information is saved is an ONE port (e.g., based on messaging with OLC 130, which is omitted from FIG. 5 for purposes of clarity).

At block 440, a waiting time period is applied before trapping responses generated based on the application of the port action for the port. The waiting time period may be denoted as Δt. It is noted that the waiting time period Δt may be different depending on various factors (e.g., the response times in the electrical domain and the optical domain may be different and may be accounted for), such as whether the probing direction is P→O or O→P, the types of CLLs being discovered, or the like, as well as various combinations thereof.

At block 445, responses are received from a management system. The responses are responses triggered as a result of application of the port action for the port selected from the compatible P-O port subset (e.g., alarms, alerts, advisories, notifications, or the like). The management system may be an EMS or other suitable type of management system. The responses are associated with the port on the other side of the cross-layer link from the port selected from the compatible P-O port subset (e.g., an ONE port where the selected port is a PNE port in probing direction P→O or a PNE port where the selected port is an ONE port in probing direction O→P). Additionally, port information, associated with the port for which the responses are received, is stored for later use in cross-correlation processing. The port information may include any information suitable for use in cross-correlation processing (e.g., a port ID of the port, timestamp data associated with the generation of the responses, or the like, as well as various combinations thereof). If the probing direction is P→O, the port for which the port action is applied is a PNE port and this triggers responses on the optical side such that the responses that are received are responses from the management system associated with the ONE (e.g., OLC 130 managing the ONE, as presented in FIG. 5) and the port information that is saved is ONE port information. If the probing direction is O→P, the port for which the port action is applied is an ONE port and this triggers responses on the packet side such that the responses that are received are responses from the management system associated with the PNE (e.g., PLC 120 managing the PNE, which is omitted from FIG. 5 for purposes of clarity) and the port information that is saved is PNE port information.

At block 450, a service is optionally reverted. This may include a determination as to whether or not to revert the service, which may be based on whether or not that service was previously migrated (e.g., if the service was previously migrated then the service is reverted). The reversion of the service may be initiated by the NC 140 based on messaging to one or both of the PLC 120 or the OLC 130. From block 450, method 400 returns to block 415, at which point a next port is selected from the compatible P-O port subset.

At block 455, the port actions (from blocks 430 and 435) are correlated with the responses (from block 445) to identify port matches. The correlation of the port actions with the responses is based on the port information stored for the port actions (in block 435) and the port information stored for the responses (in block 445). If the probing direction is P→O, PNE port actions applied for the PNE ports (e.g., port state changes, port power modulation, or the like) are correlated with the ONE EMS responses (e.g., responses triggered by ONE ports based on the port actions applied for the PNE ports) to identify PNE-ONE port matches. If the probing direction is O→P, ONE port actions applied for the ONE ports (e.g., port state changes, port power modulation, or the like) are correlated with the PNE EMS responses (responses triggered by PNE ports based on the port actions applied for the ONE ports) to identify ONE-PNE port matches.

At block 460, the results of the port correlation processing are saved. This may include storing port matches, marking discrepancies (e.g., ports of the compatible P-O port subset for which matches were not found or not definitively found), or the like.

At block 499, method 400 ends. It will be appreciated that message and information flow associated with execution of method 400 may be further understood by way of reference to FIG. 5.

It will be appreciated that, although primarily presented herein with respect to use of one probing direction for performing port isolation using active probing, in at least some embodiments both evaluations directions may be used (serially or contemporaneously) for performing port isolation using active probing.

It will be appreciated that method 400 of FIG. 4 may be adapted to perform various other functions presented herein as being supported by the network controller (e.g., NC 140 of FIG. 1) to perform port isolation using active probing.

FIG. 5 depicts example messaging, within the context of the example communication system of FIG. 1 and associated with the example process of FIG. 4, for supporting discovery of cross-layer links at network nodes of a communication network based on port isolation using active probing.

As depicted in FIG. 5, the system 500 is similar to the system 100 of FIG. 1. In the example of FIG. 5, active probing is being performed at NN 111-2, to support discovery of the CLLs 114-2 between the PNE 112-2 and the ONE 113-2.

The NC 140 initiates active probing by sending a probe message 511 (denoted as PROBE(t), which indicates that the probe message 511 is sent at time t) to the PLC 120, which causes the PLC 120 to send a corresponding probe message 512 (also denoted as PROBE(t)) to the PNE 112-2. The probe messages 511 and 512 are directed to a target PNE port of the PNE 112-2 and are configured to cause the PNE 112-2 to perform a port action on the PNE port of the PNE 112-2 in order to trigger a detectable response on an ONE port of the ONE 113-2. The port action may change or vary one or more characteristics of the PNE port of the PNE 112-2 (e.g., modulating port state in a pattern, modulating port power in a pattern, or the like). An example port control pattern is depicted in FIG. 5. The probe message 512 triggers the PNE 112-2 to execute the indicated port action on the PNE port. The probe message 512 also triggers the PNE 112-2 to respond to the PLC 120 with a probe response message 513 (denoted as RESPONSE(t+Δ), which indicates that the probe response message 513 was initiated at the PNE 112-2 at time t+Δ). The probe response message 513 causes the PLC 120 to send a corresponding probe response message 514 (also denoted as RESPONSE(t+Δ)) to NC 140.

The NN 111-2 supports the active probing responsive to the initiation of the active probing by NC 140. The PNE 112-2 receives the probe message 512 from the PLC 120 and executes the port action indicated in the probe message 512 (e.g., modifying one or more characteristics of the PNE port, such as port state or port power level, in accordance with the port control pattern). The execution of the port action by the PNE 112-2 for the PNE port results in activity on the ONE 113-2 (namely, on a corresponding ONE port of the ONE 113-2 to which the PNE port of the PNE 112-2 is connected via an CLL 114-2), such that cross-correlation processing may be performed at the NC 140 to determine that the PNE port and the ONE port are connected via a CLL 114-2 (and, thus, such that the CLL 114-2 may be identified). The activity on the ONE 113-2 may include generation of alarms or other information which may be propagated upstream by the ONE 113-2 to the OLC 130 and from the OLC 130 to the NC 140. For example, switching the PNE port from ON to OFF or reducing the power level of the PNE port may be detected by the ONE port at the other end of the CLL 114-2 to which the PNE port is connected and may result in generation of one or more associated alarms (e.g., LOS, AIS, or the like). The reporting of the activity on the ONE 113-2, responsive to the port action being applied to the PNE port on the PNE 112-2, is indicated by the response message 521 sent from the ONE 113-2 to the OLC 130 (denoted as RESPONSE(t+Δ'), which indicates that response to the port action applied at the PNE port is triggered on the ONE 113-2 at some later time that is Δ' after the time t at which the active probing was initiated by the NC 140), which in turn triggers the response message 522 sent from the OLC 130 to the NC 140 (also denoted as RESPONSE(t+Δ')). The response messages 521 and 522 may each include multiple messages, alarms, notifications, or the like. The response messages 521 and 522 are configured to provide the NC 140 with detectable response information which may be used by the NC 140 in order to identify which of the ONE ports of the ONE 113-2 is correlated to the PNE port on which the active probing was performed.

The NC 140 is configured to evaluate the information associated with the port probing action performed for the PNE port of the PNE 112-2 in order to try to identify one of the ONE ports of the ONE 113-2 that is associated with the PNE port of the PNE 112-2 via a CLL 114-2 between the PNE port of the PNE 112-2 and the one of the ONE ports of the ONE 113-2. The information that is evaluated may include information associated with the probe message 511 (e.g., the time at which it was sent, the port action that was performed, the time at which the port action was scheduled to be applied, or the like), information associated with the probe response 514 (e.g., the time at which it was received, an indication of the time at which the port action was performed, or the like or the like), information associated with the response 522 of the ONE 113-2 (e.g., optical domain alarms received from the OLC 130 responsive to the port action that was performed in the packet domain), or the like, as well as various combinations thereof. For example, if the PNE port is turned OFF and ON twice with the PNE port being kept off for two seconds the first time and three seconds the second time, alarms will be generated for the ONE port on the other side of the CLL 114-2 to which that PNE port is connected, such that a correlation of the timing of the alarms on the ONE port to the timing of the OFF/ON PNE port actions may be used to determine that the PNE port and the ONE port are matching ports connected via an associated CLL 114-2.

It will be appreciated that, although primarily presented with respect to an embodiment in which the active probing is provided in the P→O probing direction, similar types of messaging may be used for port matching and CLL identification when the active probing is performed in the O→P probing direction.

FIG. 6 depicts an example process for use by a network controller to support discovery of cross-layer links at network nodes of a communication network based on port isolation using passive probing based on traffic migration probing. The method 600 is related to migration of traffic at a source site (which, as discussed with respect to block 210 of FIG. 2, may be a location for which a compatible P-O port subset has been generated for analysis in identifying CLLs at the source site). The method 600 may be executed by the NC 140 of FIG. 1. It is noted that the functions of method 600, although presented in FIG. 6 as being performed serially, may be performed contemporaneously or in a different order than as presented in FIG. 6.

At block 601, method 600 begins.

At block 605, a compatible P-O port subset is received. The compatible P-O port subset is associated with the source site (i.e., traffic migration probing is performed at the source site for identifying CLLs at the source site). The compatible P-O port subset includes one or more ports of a PNE and one or more ports of an ONE. The compatible P-O port subset may be received based on execution of method 200 of FIG. 2.

At block 610, a probing direction is selected. The probing direction may be in a direction from the PNE toward the ONE (denoted as P→O) or in a direction from the ONE toward the PNE (denoted as O→P). Here, it is assumed that the probing direction P→O is selected and, accordingly, the remaining blocks of method 600 are related to embodiments in which the probing direction is P→O.

At block 615, a PNE port is selected from the compatible P-O port subset. It will be appreciated that a PNE port is selected, because the probing direction is P→O.

At block 620, a determination is made as to whether any ports remain in the compatible P-O port subset. In a first pass through method 600, it is expected that at least one port will still remain in the compatible P-O port subset; however, as ports are selected and removed from the compatible P-O port subset, method 600 reaches a state in which no ports remain in the compatible P-O port subset. If a determination is made that at least one port still remains in the compatible P-O port subset, method 600 proceeds to block 625. If a determination is made that no ports remain in the compatible P-O port subset, method 600 proceeds to block 650.

At block 625, a determination is made as to whether a target port is identified. A target port is a PNE port, at the PNE of the source site, from which traffic may be migrated to the PNE port selected from the compatible P-O port subset (namely, traffic is migrated into the PNE port selected from the compatible P-O port subset so as to try to identify a corresponding ONE port connected to the PNE port selected from the compatible P-O port subset via a CLL). In at least some embodiments, this may require finding a threshold amount of traffic in the target port that can be migrated to the PNE port selected from the compatible P-O port subset. It is noted that PNEs often have spare ports, which may not have any traffic available for migration to the PNE port selected from the compatible P-O port subset via a CLL. If a target port is not identified, method 600 returns to block 615 (at which point a next PNE port is selected). If a target port is identified, method 600 proceeds to block 630.

At block 630, a traffic migration pattern is selected. The traffic migration pattern may be defined as a predetermined set of traffic migrations having a predetermined timing associated therewith. The traffic migration pattern may indicate the traffic to be migrated (e.g., a quantity of traffic, a number of flows, identification of specific flows or traffic, or the like, as well as various combinations thereof), identification of the source and target PNE ports for the traffic migration, a timing of the migration of the traffic (e.g., a time at which it is to be migrated, a length of time between migration of the traffic to the target port and reversion back to the source port, or the like), or the like, as well as various combinations thereof. The traffic migration pattern is configured to change the detectable traffic activity on a ONE port by migrating some or all of the traffic on a PNE port. For example, the traffic migration pattern may be: MOVE 50% OF TRAFFIC FROM PNE PORT 1 TO PNE PORT 2, WAIT TWO SECONDS, MOVE THE TRAFFIC BACK, WAIT THREE SECONDS, MOVE 60% OF THE TRAFFIC FROM PNE PORT 1 TO PNE PORT 2, WAIT FOUR SECONDS, and MOVE THE TRAFFIC BACK.

At block 635, the traffic migration pattern is applied, to migrate traffic from the target port to the PNE port selected from the compatible P-O port subset, to generate optical traffic activity at the ONE of the source site that can be correlated to the migrated traffic. The application of the traffic migration pattern for the PNE port may be applied based on initiation of the traffic migration by a controller and execution of the traffic migration by the PNE on which the PNE port is located (e.g., initiated by the NC 140 based on messaging to the management system associated with the PNE on which the PNE port is located, which in turn controls execution of the traffic migration pattern by the PNE on which the PNE port is located). The traffic migration pattern may be applied based on control information that is provided to the PNE on which the PNE port is located (e.g., instructions, traffic migration control information such as a traffic migration pattern or the like, or the like, as well as various combinations thereof). Additionally, PNE port information, associated with migration of traffic from the target port to the PNE port selected from the compatible P-O port subset, is stored for later use in cross-correlation processing for the PNE port. The PNE port information may include any information suitable for use in cross-correlation processing (e.g., a port ID of the PNE port, timestamp data (e.g., a time at which a migration command is sent, a time at which a migration acknowledgment is received, or the like), traffic activity information associated with traffic migrated to the PNE port (e.g., traffic count information, traffic characteristics, or the like), or the like, as well as various combinations thereof).

At block 640, optical activity information, indicative of optical activity associated with the ONE, is received from a management system. The optical activity is triggered as a result of the migration of traffic from the target port to the PNE port selected from the compatible P-O port subset. The management system may be an EMS or other suitable type of management system. The optical activity is associated with ONE ports on the other side of the cross-layer link from the PNE port selected from the compatible P-O port subset. Additionally, ONE port information, associated with the ONE ports for which optical activity information is received, is stored for later use in cross-correlation processing. The ONE port information may include any information suitable for use in cross-correlation processing (e.g., a port ID of the ONE port, timestamp data (e.g., a time at which traffic activity is detected at the ONE port or the like), traffic activity information associated with traffic received at the ONE port (e.g., traffic count information, traffic characteristics, or the like), or the like, as well as various combinations thereof).

At block 645, a service is optionally reverted. This may include a determination as to whether or not to revert the migrated traffic from the PNE port selected from the compatible P-O port subset back to the target port from which it was migrated. From block 645, method 600 returns to block 615, at which point a next PNE port is selected from the compatible P-O port subset.

At block 650, the traffic migration actions (from blocks 630 and 635) are correlated with optical activity information (from block 640) to identify port matches. The correlation of the traffic migration actions with the optical activity information is based on the PNE port information associated with migration of traffic from the target port to the PNE port selected from the compatible P-O port subset (stored in block 635) and the ONE port information associated with the ONE ports for which optical activity information is received (stored in block 640). The correlation may be based on traffic counts, traffic characteristics, or the like, as well as various combinations thereof.

At block 655, the results of the port correlation processing are saved. This may include storing port matches, marking discrepancies (e.g., ports of the compatible P-O port subset for which matches were not found or not definitively found), or the like.

At block 699, method 600 ends. It will be appreciated that message and information flow associated with execution of method 600 may be further understood by way of reference to FIG. 7.

It will be appreciated that, although primarily presented herein with respect to use of the P→O probing direction for performing port isolation using passive probing based on traffic migration, in at least some embodiments the O→P probing direction may be used for performing port isolation using passive probing based on traffic migration.

It will be appreciated that, although primarily presented herein with respect to use of one probing direction for performing port isolation using passive probing based on traffic migration (again, the P→O probing direction), in at least some embodiments both evaluations directions may be used (serially, contemporaneously, concurrently, or the like) for performing port isolation using passive probing based on traffic migration.

It will be appreciated that, when port isolation using passive probing based on traffic migration is used, the migrated traffic that is used as the basis for identification of CLLs is expected to travel from a source site at which the traffic migration is performed to a destination site (the intended destination of the migrated traffic), either directly or via one or more transit sites. The method 600 primarily describes correlation processing that is performed at the source site (e.g., as the traffic traverses the CLLs between the PNE and the ONE at the source site); however, in at least some embodiments, that same migrated traffic (and knowledge of its migration at the source site) may be leveraged in order to support port isolation at one or more other sites (e.g., at the destination site, at one or more transit sites between the source site and the destination site, or the like, as well as various combinations thereof). The NC 140 may have an overall view of the correlation processing that is being performed at each of the sites such that it will know that traffic migrated at a source site can be leveraged for CLL identification at other sites (and, if it can, how it can be leveraged for CLL identification).

In at least some embodiments, for example, traffic migrated at the PNE at the source site (such that P→O correlation processing is used at the source site) might be used to perform correlation processing at the destination site as the migrated traffic is propagated from the ONE element of the destination site back up to the PNE element of the destination site via the CLLs of the destination site (i.e., O→P correlation processing is used at the destination site). The NC 140 may optionally trigger O→P correlation processing at the destination site, based on the migration of traffic at the source site, for use in identifying port matches (and, thus, CLLs) at the destination site. The NC 140 may monitor port activity at the ONE and the PNE of the destination site and save associated ONE port information (e.g., port IDs, traffic activity data, or the like, as well as various combinations thereof) and PNE port information (e.g., port IDs, traffic activity data, or the like, as well as various combinations thereof) which may be correlated for use in identifying port matches (and, thus, CLLs) at the destination site. It will be appreciated that this could be done for all of the ONE ports in the compatible P-O port subset of the destination site or could be done for a subset of the ONE ports in the compatible P-O port subset of the destination site (e.g., for specific ONE ports, such as where certain ONE port drops are known from the optical topology information).

In at least some embodiments, for example, traffic migrated at the PNE at the source site (such that P→O correlation processing is used at the source site) might be used to perform correlation processing at a transit site as the migrated traffic is propagated from the ONE element of the transit site back up to the PNE element of the transit site via the CLLs of the transit site (i.e., O→P correlation processing may be used at the transit site) and/or as the migrated traffic is propagated from the PNE element of the transit site back down to the ONE element of the transit site via the CLLs of the transit site (i.e., P→O correlation processing may be used at the transit site). The NC 140 may optionally trigger O→P correlation processing and/or P→O correlation processing at the transit site, based on the migration of traffic at the source site, for use in identifying port matches (and, thus, CLLs) at the transit site. The NC 140 may monitor port activity at the ONE and the PNE of the transit site and save associated ONE port information (e.g., port IDs, traffic activity data, or the like, as well as various combinations thereof) and PNE port information (e.g., port IDs, traffic activity data, or the like, as well as various combinations thereof) which may be correlated for use in identifying port matches (and, thus, CLLs) at the transit site. It will be appreciated that this could be done for all of the ONE ports in the compatible P-O port subset of the transit site or could be done for a subset of the ONE ports in the compatible P-O port subset of the transit site (e.g., for specific ONE ports, such as where certain ONE port drops are known from the optical topology information).

The use of the migrated traffic that has been migrated at the source site to perform correlation processing at one or more other sites may be used in place of correlation processing being applied at the one or more other sites (e.g., applied in the sense that the one or more other sites are source sites for the correlation processing), in combination with correlation processing being applied at the one or more other sites (e.g., to increase the likelihood that the CLLs at the one or more other sites are correctly identified, such as where method 600 is being separately executed for one of the other sites based on the compatible P-O port subset determined for the one of the other sites), or the like.

The leveraging of traffic migrated at a source site (i.e., the site of the migration) in order to support identification of CLLs at another site (e.g., destination site or transit site) may be further understood by way of reference to FIG. 7.

It will be appreciated that, although primarily presented with respect to embodiments in which traffic migration is performed at the source site in conjunction with correlation processing being performed at the source site, in at least some embodiments traffic migration may be initiated at a source site when correlation processing is not being performed at the source site (e.g., the correlation processing is not needed or all port matches at the source site have already been identified) so as to support correlation processing at one or more other sites (e.g., one or more destination sites, one or more transit sites, or the like, as well as various combinations thereof).

It will be appreciated that method 600 of FIG. 6 may be adapted to perform various other functions presented herein as being supported by the network controller (e.g., NC 140 of FIG. 1) to perform port isolation using active probing.

FIG. 7 depicts example messaging, within the context of the example communication system of FIG. 1 and associated with the example process of FIG. 6, for supporting discovery of cross-layer links at network nodes of a communication network based on port isolation using passive probing based on traffic migration probing.

As depicted in FIG. 7, the system 700 is similar to the system 100 of FIG. 1. In the example of FIG. 7, passive probing, based on migration of traffic, is being performed at NN 111-2, to support discovery of the CLLs 114-2 between the PNE 112-2 and the ONE 113-2. The traffic is migrated between PNE ports at the PNE 112-2 and, accordingly, the NN 111-2 is considered to be the migration source site. The traffic that is migrated is propagated from NN 111-2 to NN 111-1 (and, accordingly, the NN 111-1 is considered to be the migration destination site).

The NC 140 initiates passive probing by sending a probe message 711 (denoted as PROBE(t), which indicates that the probe message 711 is sent at time t) to the PLC 120, which causes the PLC 120 to send a corresponding probe message 712 (also denoted as PROBE(t)) to the PNE 112-2. The probe messages 711 and 712 are directed to the PNE 112-2 and are configured to cause migration of traffic between PNE ports at the PNE 112-2 in order to trigger a detectable response on an ONE port of the ONE 113-2. The traffic migration may be from a PNE port of the PNE 112-2 that is being evaluated (from a compatible P-O port subset associated with the source migration site) to an available PNE port of the PNE 112-2. The probe message 712 triggers the PNE 112-2 to migrate the traffic between the indicated PNE ports. The probe message 712 also triggers the PNE 112-2 to respond to the PLC 120 with a probe response message 713 (denoted as RESPONSE(t+Δ), which indicates that the probe response message 513 was initiated at the PNE 112-2 at time (t+Δ). The probe response message 713 causes the PLC 120 to send a corresponding probe response message 714 (also denoted as RESPONSE(t+Δ)) to the NC 140.

The NN 111-2 supports the passive probing responsive to the initiation of the passive probing by NC 140. The PNE 112-2 receives the probe message 712 from the PLC 120 and executes the traffic migration indicated in the probe message 712 (e.g., triggering migration of traffic from the PNE port of the PNE 112-2 that is being evaluated to the available PNE port of the PNE 112-2). The execution of the traffic migration by the PNE 112-2 for the PNE port results in port activity on the ONE 113-2 (namely, on a corresponding ONE port of the ONE 113-2 to which the PNE port of the PNE 112-2 is connected via an CLL 114-2), such that cross-correlation processing may be performed at the NC 140 to determine that the PNE port and the ONE port are connected via a CLL 114-2 (and, thus, such that the CLL 114-2 may be identified). The port activity on the ONE 113-2 may include traffic activity on the ONE port (e.g., a decrease in the amount of traffic being handled by the ONE port that is connected to the PNE port that is being evaluated due to the migration of the traffic from the PNE port that is being evaluated to the available PNE port). For example, migrating traffic of a flow from the PNE port that is being evaluated to the available PNE port may result in a reduction in the byte count at the ONE port at the other end of the CLL 114-2 to which the PNE port is connected, which may result in generation of one or more associated alarms or events associated with the ONE port, reporting of new byte count information for the ONE port, or the like, as well as various combinations thereof. The reporting of the port activity on the ONE 113-2, responsive to the traffic migration at the PNE port on the PNE 112-2, is indicated by the response message 721 sent from the ONE 113-2 to the OLC 130 (denoted as PORT ACTIVITY(t+Δ'), which indicates that response to the traffic migration performed at the PNE port is triggered on the ONE 113-2 at some later time that is Δ' after the time t at which the passive probing was initiated by the NC 140), which in turn triggers the response message 722 sent from the OLC 130 to the NC 140 (also denoted as PORT ACTIVITY(t+Δ')). The response messages 721 and 722 may each include multiple messages, alarms, notifications, traffic counts, or the like. The response messages 721 and 722 are configured to provide the NC 140 with detectable response information which may be used by the NC 140 in order to identify which of the ONE ports of the ONE 113-2 is correlated to the PNE port on which passive probing was performed.

The NC 140 is configured to evaluate the information associated with the port probing action performed for the PNE port of the PNE 112-2 in order to try to identify one of the ONE ports of the ONE 113-2 that is associated with the PNE port of the PNE 112-2 via a CLL 114-2 between the PNE port of the PNE 112-2 and the one of the ONE ports of the ONE 113-2. The information that is evaluated may include information associated with the probe message 711

(e.g., the time at which it was sent, information that describes the traffic migration that was performed, the time at which the traffic migration was scheduled to be performed, or the like), information associated with the probe response 714 (e.g., the time at which it was received, an indication of the time at which the traffic migration was performed, or the like), information associated with the response 722 of the ONE 113-2 (e.g., optical domain alarms or traffic count information that was received from the OLC 130 responsive to the traffic migration that was performed in the packet domain), or the like, as well as various combinations thereof. For example, if the flow that is migrated from the PNE port is sending 100 kbps, the traffic count that is collected from the ONE port on the other of the CLL 114-2 to which that PNE port is connected will reflect the reduction of 100 kbps, such that a correlation of the timing of the reduced traffic count on the ONE port to the timing of the traffic migration at the PNE port may be used to determine that the PNE port and the ONE port are matching ports connected via an associated CLL 114-2.

It will be appreciated that, although primarily presented with respect to an embodiment in which the passive probing based on traffic migration is provided in the P→O probing direction, similar types of messaging may be used for port matching and CLL identification when the passive probing based on traffic migration is performed in the O→P probing direction.

FIG. 8 depicts an example process for use by a network controller to support discovery of cross-layer links at network nodes of a communication network based on port isolation using passive probing based on traffic injection probing. The method 800 is related to injection of traffic into the data plane such that it traverses a target site (which, as discussed with respect to block 210 of FIG. 2, may be a location for which a compatible P-O port subset has been generated for analysis in identifying CLLs at the target site). The method 800 may be executed by the NC 140 of FIG. 1. It is noted that the functions of method 800, although presented in FIG. 8 as being performed serially, may be performed contemporaneously or in a different order than as presented in FIG. 8.

At block 801, method 800 begins.

At block 805, a compatible P-O port subset is received. The compatible P-O port subset is associated with the target site (i.e., traffic migration probing is performed at the target site for identifying CLLs at the target site). The target site may be a transit site for the injected traffic or a destination site for the injected traffic. The compatible P-O port subset includes one or more ports of a PNE and one or more ports of an ONE. The compatible P-O port subset may be received based on execution of method 200 of FIG. 2.

At block 810, a probing direction is selected. The probing direction may be in a direction from the PNE toward the ONE (denoted as P→O) or in a direction from the ONE toward the PNE (denoted as O→P). Here, it is assumed that the probing direction P→O is selected and, accordingly, the remaining blocks of method 800 are related to embodiments in which the probing direction is P→O.

At block 815, a PNE port is selected from the compatible P-O port subset. It will be appreciated that a PNE port is selected, because the probing direction is P→O.

At block 820, a determination is made as to whether any ports remain in the compatible P-O port subset. In a first pass through method 800, it is expected that at least one port will still remain in the compatible P-O port subset; however, as ports are selected and removed from the compatible P-O port subset, method 800 reaches a state in which no ports remain in the compatible P-O port subset. If a determination is made that at least one port still remains in the compatible P-O port subset, method 800 proceeds to block 825. If a determination is made that no ports remain in the compatible P-O port subset, method 800 proceeds to block 850.

At block 825, a service is optionally migrated. This may include a determination as to whether or not to migrate the service. The service that is migrated may be a service on the PNE port selected from the compatible P-O port subset. The service may be migrated in order to prevent a disruption to the service, in order to ensure that the PNE port has a utilization level that is low enough that traffic increases on the PNE port due to the traffic injection create detectable activity changes on the ONE ports, or the like, as well as various combinations thereof. The migration of the service may be initiated by the NC 140 based on messaging to one or both of the PLC 120 or the OLC 130.

At block 830, a traffic injection pattern is selected. The traffic injection pattern may be defined as a predetermined set of traffic injections having a predetermined timing associated therewith. The traffic injection pattern may indicate the traffic to be injected (e.g., a quantity of traffic, a number of flows, or the like, as well as various combinations thereof), identification of the target PNE port for the traffic injection, a timing of the injection of the traffic (e.g., a time at which it is to be injected, a length of time of the traffic injection, or the like), or the like, as well as various combinations thereof. The traffic injection pattern is configured to change the detectable traffic activity on a ONE port by injecting traffic such that it traverses a PNE port. The traffic injections of the traffic injection pattern may have similar or different characteristics associated therewith, which may be based on one or more of traffic rate, traffic volume, traffic signal characteristics, or the like, as well as various combinations thereof. For example, a traffic injection pattern may be: INJECT TRAFFIC AT 100 KBPS FOR TWO SECONDS, WAIT 2 SECONDS, and INJECT TRAFFIC AT 200 KBPS FOR ONE SECOND. It will be appreciated that various other traffic characteristics and timings may be used.

At block 835, the traffic injection pattern is applied, to inject traffic into the data plane such that the injected traffic egresses the PNE port selected from the compatible P-O port subset (and, thus, such that it is routed over a CLL to an ONE port of the ONE at the target site), to generate optical traffic activity at the ONE of the target site that can be correlated to the injected traffic. The application of the traffic injection pattern for the PNE port may be applied based on initiation of the traffic injection by a controller and execution of the traffic injection by a data plane access device configured to inject traffic such that the injected traffic traverses the PNE port (e.g., initiated by the NC 140 based on messaging to the data plane access device, which in turn controls execution of the traffic injection pattern such that the injected traffic traverses the PNE port). The traffic injection pattern may be applied based on control information that is provided to the data plane access device (e.g., instructions, traffic migration control information such as a traffic migration pattern or the like, or the like, as well as various combinations thereof). Additionally, PNE port information, associated with injection of traffic that will traverse the PNE port selected from the compatible P-O port subset, is stored for later use in cross-correlation processing for the PNE port. The PNE port information may include any information suitable for use in cross-correlation processing (e.g., a port ID of the PNE port, timestamp data (e.g., a time at which an injection command is sent, a time at which the traffic injection is scheduled to be performed, or the like), traffic activity information associated with traffic injected into the data plane such that it traversed to the PNE port (e.g., traffic count information, traffic characteristics, or the like), or the like, as well as various combinations thereof).

At block 840, optical activity information, indicative of optical activity associated with the ONE, is received from a management system. The optical activity is triggered as a result of the injection of traffic into the data plane such that the injected traffic egresses the PNE port selected from the compatible P-O port subset and is routed over a CLL to an ONE port of the ONE at the target site. The management system may be an EMS or other suitable type of management system. The optical activity is associated with ONE ports at the target site (namely, on the other side of the cross-layer link from the PNE port selected from the compatible P-O port subset). Additionally, ONE port information, associated with the ONE ports for which optical activity information is received, is stored for later use in cross-correlation processing. The ONE port information may include any information suitable for use in cross-correlation processing (e.g., a port ID of the ONE port, timestamp data (e.g., a time at which traffic activity is detected at the ONE port or the like), traffic activity information associated with traffic received at the ONE port (e.g., traffic count information, traffic characteristics, or the like), or the like, as well as various combinations thereof).

At block 845, a service is optionally reverted. This may include a determination as to whether or not to revert the migrated service back to the PNE port selected from the compatible P-O port subset. The service that is reverted may be a service that was migrated in order to prevent a disruption to the service, a service that was migrated in order to ensure that the PNE port had a utilization level that is low enough that traffic increases on the PNE port due to the traffic injection created detectable activity changes on the ONE ports, or the like, as well as various combinations thereof. From block 845, method 800 returns to block 815, at which point a next PNE port is selected from the compatible P-O port subset.

At block 850, the traffic injection actions (from blocks 830 and 835) are correlated with optical activity information (from block 840) to identify port matches. The correlation of the traffic injection actions with the optical activity information is based on the PNE port information associated with injection of traffic into the data plane such that it traverses the PNE port selected from the compatible P-O port subset (stored in block 835) and the ONE port information associated with the ONE ports for which optical activity information is received (stored in block 840). The correlation may be based on traffic counts, traffic characteristics, or the like, as well as various combinations thereof.

At block 855, the results of the port correlation processing are saved. This may include storing port matches, marking discrepancies (e.g., ports of the compatible P-O port subset for which matches were not found or not definitively found), or the like.

At block 899, method 800 ends. It will be appreciated that message and information flow associated with execution of method 800 may be further understood by way of reference to FIG. 9.

It will be appreciated that, although primarily presented herein with respect to use of the P→O probing direction for performing port isolation using passive probing based on traffic injection, in at least some embodiments the O→P probing direction may be used for performing port isolation using passive probing based on traffic injection.

It will be appreciated that, although primarily presented herein with respect to use of one probing direction for performing port isolation using passive probing based on traffic injection (again, the P→O probing direction), in at least some embodiments both evaluations directions may be used (serially or contemporaneously) for performing port isolation using passive probing based on traffic injection.

It will be appreciated that, when port isolation using passive probing based on traffic injection is used, the injected traffic that is used as the basis for identification of CLLs is expected to travel from an injection site at which the traffic injection is performed to a destination site (the intended destination of the injected traffic), either directly or via one or more transit sites. The method 800 primarily describes correlation processing that is performed at a single target site (e.g., a transit site or a destination site); however, in at least some embodiments, that same injected traffic (and knowledge of its injection at the injection site) may be leveraged in order to support port isolation at multiple sites (e.g., at multiple transit sites, at one or more transit sites and the destination site, or the like). The NC 140 may have an overall view of the correlation processing that is being performed at each of the sites such that it will know that traffic injected at the injection site can be leveraged for CLL identification at multiple other sites (and, if it can, how it can be leveraged for CLL identification).

In at least some embodiments, for example, traffic injected such that it egresses the PNE port at the target site where the target site is a transit site (such that P→O correlation processing is used at the target site) might be used to perform correlation processing at the destination site as the injected traffic is propagated from the ONE element of the destination site back up to the PNE element of the destination site via the CLLs of the destination site (i.e., O→P correlation processing is used at the destination site). The NC 140 may optionally trigger O→P correlation processing at the destination site, based on the injection of traffic such that it egresses the PNE port at the transit site, for use in identifying port matches (and, thus, CLLs) at the destination site. The NC 140 may monitor port activity at the ONE and the PNE of the destination site and save associated ONE port information (e.g., port IDs, traffic activity data, or the like, as well as various combinations thereof) and PNE port information (e.g., port IDs, traffic activity data, or the like, as well as various combinations thereof) which may be correlated for use in identifying port matches (and, thus, CLLs) at the destination site. It will be appreciated that this could be done for all of the ONE ports in the compatible P-O port subset of the destination site or could be done for a subset of the ONE ports in the compatible P-O port subset of the destination site (e.g., for specific ONE ports, such as where certain ONE port drops are known from the optical topology information).

In at least some embodiments, for example, traffic injected such that it egresses the PNE port at the target site where the target site is a transit site (such that P→O correlation processing is used at the target site) might be used to perform correlation processing at a second transit site as the injected traffic is propagated from the ONE element of the second transit site back up to the PNE element of the second transit site via the CLLs of the second transit site (i.e., O→P correlation processing may be used at the second transit site) and/or as the injected traffic is propagated from the PNE element of the second transit site back down to the ONE element of the second transit site via the CLLs of the second transit site (i.e., P→O correlation processing may be used at the second transit site). The NC 140 may optionally trigger O→P correlation processing and/or P→O correlation processing at the second transit site, based on the injection of traffic into the data plane, for use in identifying port matches (and, thus, CLLs) at the second transit site. The NC 140 may monitor port activity at the ONE and the PNE of the second transit site and save associated ONE port information (e.g., port IDs, traffic activity data, or the like, as well as various combinations thereof) and PNE port information (e.g., port IDs, traffic activity data, or the like, as well as various combinations thereof) which may be correlated for use in identifying port matches (and, thus, CLLs) at the second transit site. It will be appreciated that this could be done for all of the ONE ports in the compatible P-O port subset of the second transit site or could be done for a subset of the ONE ports in the compatible P-O port subset of the second transit site (e.g., for specific ONE ports, such as where certain ONE port drops are known from the optical topology information).

The use of the injected traffic that has been injected into the data plane to perform correlation processing at one or more other sites may be used in place of correlation processing being applied at the one or more other sites (e.g., applied in the sense that the one or more other sites are source sites for the correlation processing), in combination with correlation processing being applied at the one or more other sites (e.g., to increase the likelihood that the CLLs at the one or more other sites are correctly identified, such as where method 800 is being separately executed for one of the other sites based on the compatible P-O port subset determined for the one of the other sites), or the like.

The leveraging of traffic injected into the data plane to support identification of CLLs at a target site in order to support identification of CLLs at another site (e.g., destination site or transit site) may be further understood by way of reference to FIG. 9.

It will be appreciated that, although primarily presented with respect to embodiments in which traffic injection is performed for a target site in conjunction with correlation processing being performed at the target site, in at least some embodiments traffic injection may be performed for a target when correlation processing is not being performed at the target site (e.g., the correlation processing is not needed or all port matches at the target site have already been identified) so as to support correlation processing at one or more other sites (e.g., one or more destination sites, one or more transit sites, or the like, as well as various combinations thereof).

It will be appreciated that method 800 of FIG. 8 may be adapted to perform various other functions presented herein as being supported by the network controller (e.g., NC 140 of FIG. 1) to perform port isolation using active probing.

FIG. 9 depicts example messaging, within the context of the example communication system of FIG. 1 and associated with the example process of FIG. 8, for supporting discovery of cross-layer links at network nodes of a communication network based on port isolation using passive probing based on traffic injection probing.

As depicted in FIG. 9, the system 900 is similar to the system 100 of FIG. 1. In the example of FIG. 9, passive probing, based on injection of traffic in the packet layer, is being performed in order to trigger a traffic flow on NN 111-2 to support discovery of the CLLs 114-2 between the PNE 112-2 and the ONE 113-2. The traffic is injected at a packet data plane access point 901 and flows from the packet data plane access point 901 to the NN 111-1 via the NN 111-2 (and, accordingly, the packet data plane access point 901 is considered to be the source injection site, the NN 111-2 is considered to be the injection transit site, and the NN 111-1 is considered to be the injection destination site).

The NC 140 initiates passive probing by sending a probe message 911 (denoted as PROBE(t), which indicates that the probe message 911 is sent at time t) to the PLC 120, which causes the PLC 120 to send a corresponding probe message 912 (also denoted as PROBE(t)) to the packet data plane access point 901. The probe messages 911 and 912 are directed to packet data plane access point 901 and are configured to cause injection of traffic at the packet data plane access point 901, such that the injected traffic traverses a target PNE port of the PNE 112-2, in order to trigger a detectable response on an ONE port of the ONE 113-2.

The packet data plane access point 901 supports the passive probing responsive to the initiation of the passive probing by NC 140. The packet data plane access point 901 receives the probe message 912 from the PLC 120 and executes the traffic injection indicated in the probe message 912 (e.g., triggering injection of traffic at the packet data plane access point 901 such that the injected traffic traverses a target PNE port of the PNE 112-2). The execution of the traffic injection by the packet data plane access point 901 causes the injected traffic to flow through the target PNE port of the PNE 112-2, which results in port activity on the ONE 113-2 (namely, on a corresponding ONE port of the ONE 113-2 to which the PNE port of the PNE 112-2 is connected via an CLL 114-2), such that cross-correlation processing may be performed at the NC 140 to determine that the PNE port and the ONE port are connected via a CLL 114-2 (and, thus, such that the CLL 114-2 may be identified).

The NN 111-2 supports the passive probing responsive to the initiation of the passive probing by NC 140. The PNE 112-2 receives the injected traffic from the packet data plane access point 901 and routes the traffic from the target PNE port of the PNE 112-2 that is being evaluated to one of the ONE ports of the ONE 113-2 to which the target PNE port of the PNE 112-2 is connected by one of the CLLs 114-2. This results in port activity on the ONE 113-2 (namely, on a corresponding ONE port of the ONE 113-2 to which the PNE port of the PNE 112-2 is connected via an CLL 114-2), such that cross-correlation processing may be performed at the NC 140 to determine that the PNE port and the ONE port are connected via a CLL 114-2 (and, thus, such that the CLL 114-2 may be identified). The port activity on the ONE 113-2 may include traffic activity on the ONE port (e.g., an increase in the amount of traffic being handled by the ONE port that is connected to the PNE port that is being evaluated due to the injection of the traffic such that it traverses the PNE port that is being evaluated). For example, injection of traffic into the packet data plane such that the injected traffic flows over the target PNE port that is being evaluated may result in an increase in the byte count at the ONE port at the other end of the CLL 114-2 to which the target PNE port is connected, which may result in generation of one or more associated alarms or events associated with the ONE port, reporting of new byte count information for the ONE port, or the like, as well as various combinations thereof. The reporting of the port activity on the ONE 113-2, responsive to the traffic injection at the PNE port on the PNE 112-2, is indicated by the response message 921 sent from the ONE 113-2 to the OLC 130 (denoted as PORT ACTIVITY(t+Δ'), which indicates that response to the traffic injection performed at the PNE port is triggered on the ONE 113-2 at some later time that is Δ' after the time t at which the passive probing was initiated by the NC 140), which in turn triggers the response message 922 sent from the OLC 130 to the NC 140 (also denoted as PORT ACTIVITY(t+Δ')). The response messages 921 and 922 may each include multiple messages, alarms, notifications, traffic counts, or the like. The response messages 921 and 922 are configured to provide the NC 140 with detectable response information which may be used by the NC 140 in order to identify which of the ONE ports of the ONE 113-2 is correlated to the PNE port on which passive probing was performed.

The NC 140 is configured to evaluate the information associated with the port probing action performed for the PNE port of the PNE 112-2 in order to try to identify one of the ONE ports of the ONE 113-2 that is associated with the PNE port of the PNE 112-2 via a CLL 114-2 between the PNE port of the PNE 112-2 and the one of the ONE ports of the ONE 113-2. The information that is evaluated may include information associated with the probe message 911 (e.g., the time at which it was sent, information that describes the traffic migration that was performed, the time at which the traffic migration was scheduled to be performed, or the like), information associated with the response 922 of the ONE 113-2 (e.g., optical domain alarms or traffic count information that was received from the OLC 130 responsive to the traffic migration that was performed in the packet domain), or the like, as well as various combinations thereof. For example, if the flow that is injected such that it traverses the target PNE port is sending 100 kbps, the traffic count that is collected from the ONE port on the other of the CLL 114-2 to which that PNE port is connected will reflect the increase of 100 kbps, such that a correlation of the timing of the increased traffic count on the ONE port to the timing of the traffic injection onto the PNE port may be used to determine that the PNE port and the ONE port are matching ports connected via an associated CLL 114-2.

It will be appreciated that, although primarily presented with respect to an embodiment in which the passive probing based on traffic injection is provided in the P→O probing direction, similar types of messaging may be used for port matching and CLL identification when the passive probing based on traffic injection is performed in the O→P probing direction.

It will be appreciated that, although primarily presented with respect to embodiments in which port matching based on probing is performed for CLLs that are E-O optical connections, in at least some embodiments port matching that is based on probing also may be performed for CLLs that are E/O-O connections (e.g., where the ONEs may be purely photon systems such as OXCs, MEMS, or the like). In at least some embodiments, port matching that for CLLs that are E/O-O connections may be performed using service migration and ONE port switching.

It will be appreciated that, although primarily presented with respect to embodiments in which the port matching processing (and, in particular, port isolation based on port probing) is performed serially on a per-port, per-site basis (e.g., one port is probed at a time at a site), various embodiments may be configured to support parallel processing at various levels of granularity (e.g., parallel processing of multiple ports at a site, parallel processing of ports at multiple sites, parallel processing of multiple ports across multiple sites, or the like). In at least some embodiments, within a site, concurrent probing of multiple ports can be achieved using coding, which allows for a unique association of a port probing pattern with a port that is being probed independent of the probing technique that is used such that, when seeking correlation of response signals, this uniqueness can be exploited to match ports. The benefit of being able to probe multiple ports at a site concurrently is that it is expected to speed up the overall discovery process. It is noted that a nontrivial constraint to being able to concurrently probe ports at the same site is the response time of the EMS, since excessive probing (e.g., multiple probes within a short period of time) may cause the EMS to enter a mode of relaying only the most critical messages instead of all of them and such a filtering of EMS messages could compromise the ability to identify correlation between ports.

It will be appreciated that various combinations of the above-described port matching techniques (e.g., classification, probing, or the like) may be used in combination to support port matching for identification of CLLs.

Figure 10:
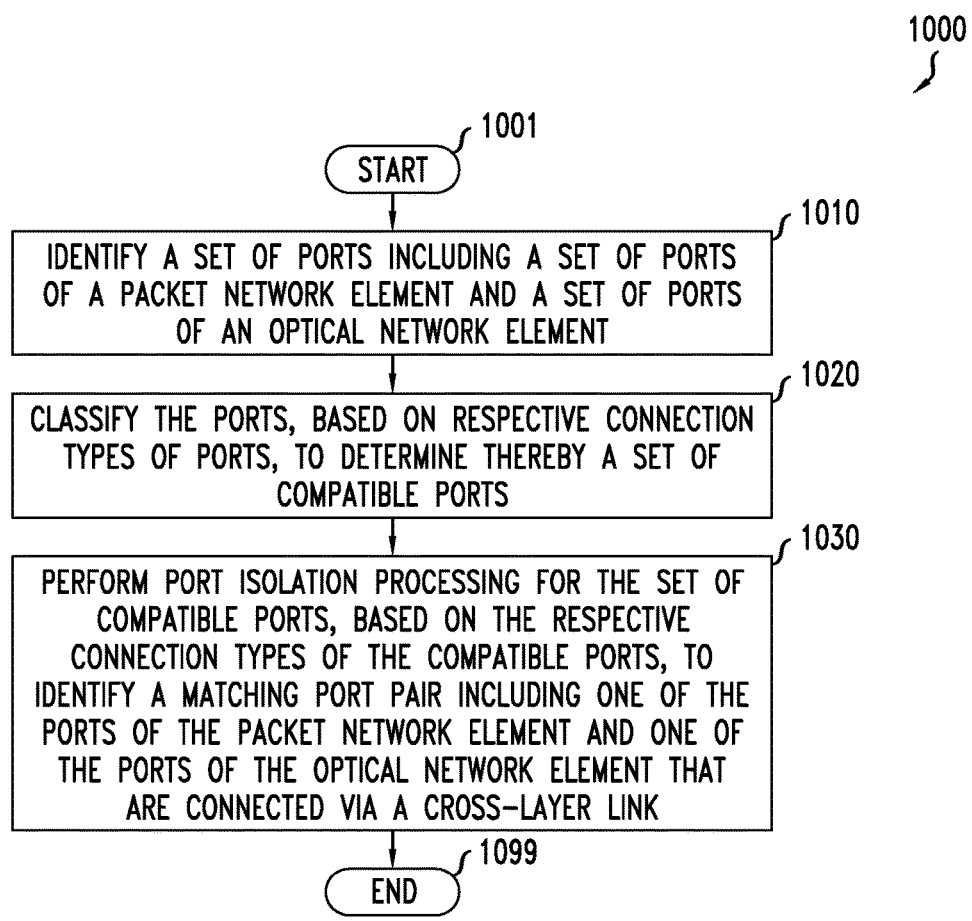
FIG. 10 depicts an example method for use by a controller to support discovery of cross-layer links based on port classification.

FIG. 10 depicts an example method for use by a controller to support discovery of cross-layer links based on port classification. At block 1001, method 1000 begins. At block 1010, a set of ports, including a set of ports of a packet network element and a set of ports of an optical network element, is identified. The ports have a respective connection types associated therewith (e.g., each port may support an electrical connection type or an optical connection type). At block 1020, the ports are classified, based on the respective connection types of the ports, to determine thereby a set of compatible ports. The set of compatible ports includes at least one of the ports of the packet network element and at least one of the ports of the optical network element. At block 1030, port isolation processing is performed for the set of compatible ports, based on the respective connection types of the compatible ports, to identify a matching port pair including one of the ports of the packet network element and one of the ports of the optical network element that are connected via a cross-layer link. It will be appreciated that port isolation processing that is performed for the set of compatible ports may result in identification of multiple matching port pairs connected via respective cross-layer links. At block 1099, method 1000 ends.

Figure 11:
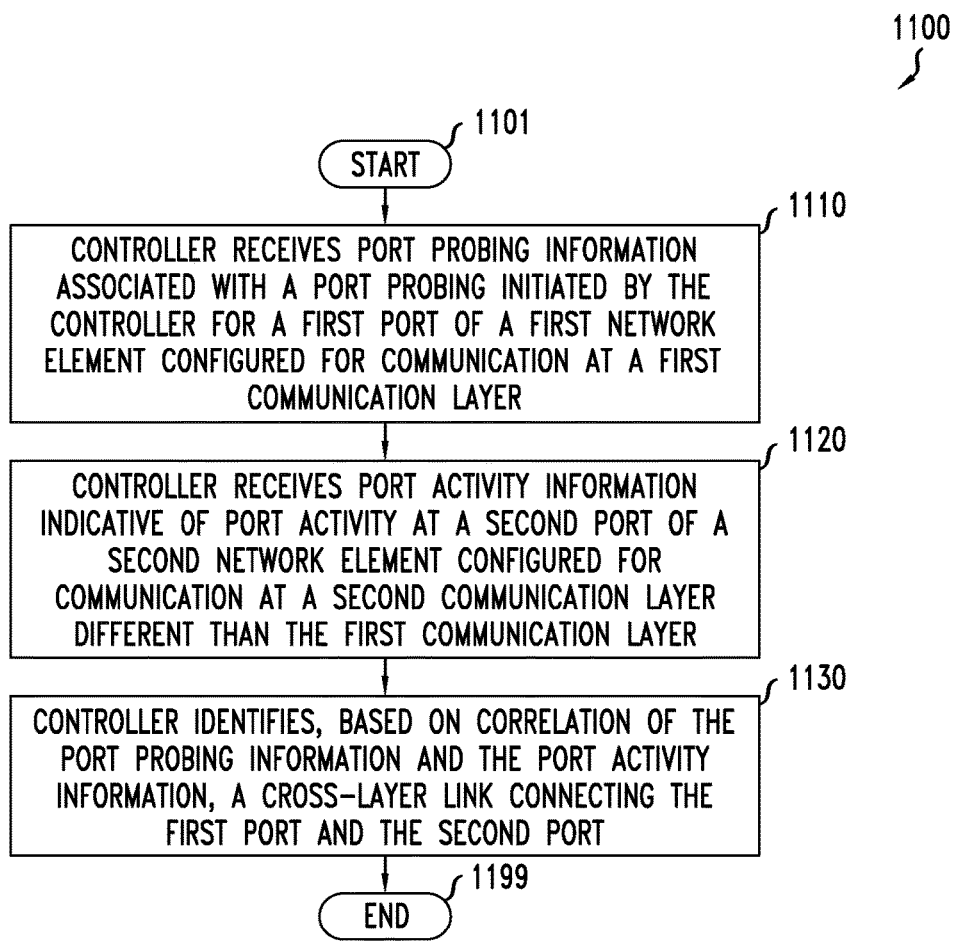
FIG. 11 depicts an example method for use by a controller to support discovery of cross-layer links based on port probing.

FIG. 11 depicts an example method for use by a controller to support discovery of cross-layer links based on port probing. At block 1101, method 1100 begins. At block 1110, the controller receives port probing information associated with a port probing initiated by the controller for a first port of a first network element configured for communication at a first communication layer. At block 1120, the controller receives port activity information indicative of port activity at a second port of a second network element configured for communication at a second communication layer different than the first communication layer. At block 1130, the controller identifies, based on correlation of the port probing information and the port activity information, a cross-layer link connecting the first port and the second port. At block 1199, method 1100 ends.

Figure 12:
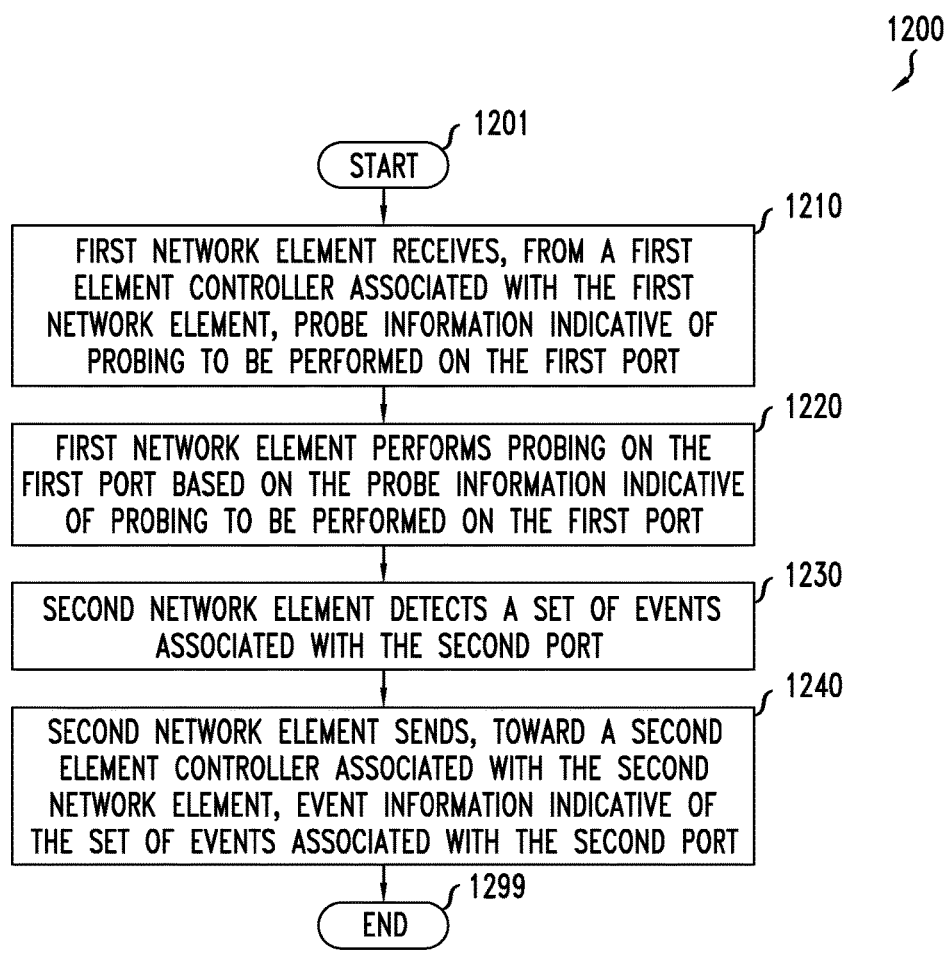
FIG. 12 depicts an example method for use by a network element to support discovery of cross-layer links at the network element.

FIG. 12 depicts an example method for use by a network element to support discovery of cross-layer links at the network element. As discussed further below, the functions of method 1200 may be performed by a network node, which may include a first network element configured for communication at a first communication layer and including a first port (e.g., one of a packet network element or an optical network element) and a second network element configured for communication at a second communication layer and including a second port (e.g., the other of the packet network element and the optical network element) where first port and the second port are configured to be connected via a cross-layer link, and a portion of the functions of method 1200 may be performed by the first network element and a portion of the functions of method 1200 may be performed by the second network element to support discovery of an association of the first port and the second port (and, thus, support identification of the cross-layer link). At block 1201, method 1200 begins. At block 1210, the first network element receives, from a first element controller associated with the first network element, probe information indicative of probing to be performed on the first port. At block 1220, the first network element performs probing on the first port based on the probe information indicative of probing to be performed on the first port. At block 1230, the second network element detects a set of events associated with the second port. At block 1240, the second network element sends, toward a second element controller associated with the second network element, event information indicative of the set of events associated with the second port. At block 1299, method 1200 ends (although it will be appreciated that the first and second network elements may continue to operate to perform functions that support discovery of cross-layer links therebetween.

It will be appreciated that various embodiments of the cross-layer link discovery capability may provide various advantages or potential advantages. For example, various embodiments of the cross-layer link discovery capability may enable automated (remote) discovery of links interconnecting IP and optical equipage at one or more network sites in a multi-vendor network, thereby obviating the need for expensive and time-consuming on-site visits by network personnel (either during network rollout or turn-up or in subsequent site visits), avoiding human errors associated with on-site visits by network personnel to determine and document equipage interconnectivity (both of which are typically vulnerable to documentation and observation errors or un-documented network repairs and patches), enabling use of knowledge of the interconnections for cross-layer (logical and physical layer) network resource optimization and dynamic management, such as in SDN networking, so that network operators can get the most out of their network capacity, and the like. For example, various embodiments of the cross-layer link discovery capability may enable automated (remote) discovery of links interconnecting IP and optical equipage at one or more network sites in a multi-vendor network using an approach that is vendor independent (i.e., that does not depend strongly on any specific vendor equipage capabilities and features). For example, various embodiments of the cross-layer link discovery capability may enable automated (remote) discovery of links interconnecting IP and optical equipage at one or more network sites in a multi-vendor network where proprietary features for cross-layer link determination in same-vendor devices cannot be universally applied throughout the network for cross-layer link discovery. For example, various embodiments of the cross-layer link discovery capability may enable automated (remote) discovery of links interconnecting IP and optical equipage for both pre-operational scenarios and operational scenarios (e.g., the two operational modes, pre-operational and operational, allow fast interconnection link determination in non-operating networks while doing so with minimal disruption to active online services in operational networks). For example, various embodiments of the cross-layer link discovery capability may enable automated (remote) discovery of links interconnecting IP and optical equipage without requiring standardization for handling of electrical CLLs, such as without requiring standardization of identification of sending ports in the digital signal format (e.g., which OUT frame fields to populate), standardization of changes to existing link-layer protocols (e.g., LLDP or the like), or the like. For example, various embodiments of the cross-layer link discovery capability may enable automated (remote) discovery of links interconnecting IP and optical equipage for optical CLLs (which still may not be possible even where standardization discussed above was realized). It will be appreciated that various embodiments of the cross-layer link discovery capability may provide various other advantages or potential advantages.

Figure 13:
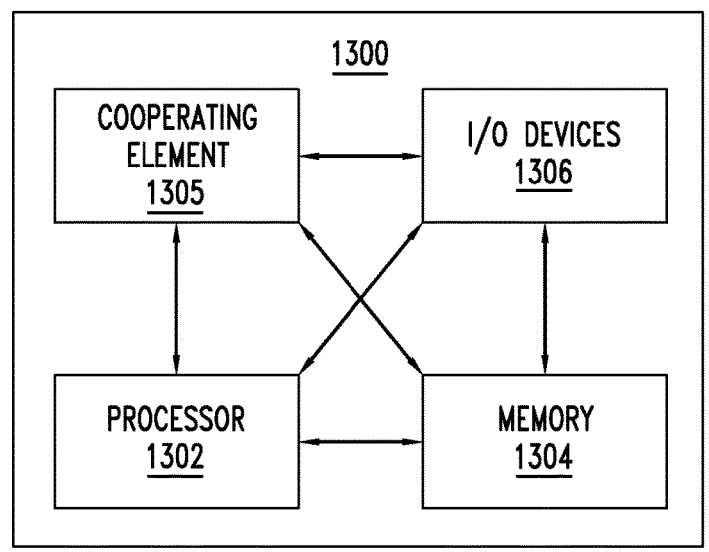
FIG. 13 depicts a high-level block diagram of a computer suitable for use in performing various functions presented herein.

FIG. 13 depicts a high-level block diagram of a computer suitable for use in performing various functions described herein.

The computer 1300 includes a processor 1302 (e.g., a central processing unit (CPU), a processor having a set of processor cores, or the like) and a memory 1304 (e.g., a random access memory (RAM), a read only memory (ROM), or the like). The processor 1302 and the memory 1304 are communicatively connected.

The computer 1300 also may include a cooperating element 1305. The cooperating element 1305 may be a hardware device. The cooperating element 1305 may be a process that can be loaded into the memory 1304 and executed by the processor 1302 to implement functions as discussed herein. The cooperating element 1305, when implemented as a process, can be stored (along with associated data) on a non-transitory computer-readable storage medium such as a storage device or other storage element (e.g., a magnetic drive, an optical drive, or the like).

The computer 1300 also may include one or more input/output devices 1306. The input/output devices 1306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1300 of FIG. 13 may represent a general architecture and functionality suitable for implementing functional elements described herein, portions of functional elements described herein, or the like, as well as various combinations thereof. For example, computer 1300 may provide a general architecture and functionality that is suitable for implementing one or more of an NN 111, a PNE 112, an ONE 113, a PLC 120, an OLC 130, an NC 140, or other elements, devices, functions, or capabilities presented herein.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a controller, the controller comprising a processor and a memory communicatively connected to the processor, the processor configured to:
receive port probing information associated with a port probing initiated for a first port of a first network element configured for communication at a first communication layer;
receive port activity information indicative of port activity at a second port of a second network element configured for communication at a second communication layer different than the first communication layer; and
identify, based on correlation of the port probing information and the port activity information, a cross-layer link connecting the first port and the second port.

2. The apparatus of claim 1, wherein:
the first network element comprises a packet network element and second network element comprises an optical network element; or
the first network element comprises an optical network element and the second network element comprises a packet network element.

3. The apparatus of claim 1, wherein the port probing is configured to generate a detectable response at the second port of the second network element.

4. The apparatus of claim 1, wherein the port probing comprises at least one of active probing, passive probing based on traffic migration, or passive probing based on traffic injection.

5. The apparatus of claim 1, wherein the port probing comprises at least one of:
active probing based on a port modulation pattern configured to modulate a port characteristic of the first port;
passive probing based on a traffic migration pattern configured to control migration of traffic between the first port and at least one other port of the first network element; or
passive probing based on a traffic injection pattern configured to control injection of traffic at the first communication layer such that the traffic egresses the first network element at the first port.

6. The apparatus of claim 1, wherein the port probing information comprises at least one of:
a port probing instruction provided toward an element management system associated with the first network element; or
an acknowledgment message, from an element management system associated with the first network element, responsive to a port probing instruction provided to the element management system.

7. The apparatus of claim 1, wherein the port activity information comprises:

a message from an element management system associated with the second network element; or
traffic activity information associated with the second port of the second network element.

8. The apparatus of claim 1, wherein to correlate the port probing information and the port activity information, the processor is configured to:
correlate timing information of the port probing information with timing information of the port activity information.

9. The apparatus of claim 1, wherein the processor is configured to:
initiate, contemporaneously with initiation of the port probing for the first port of the first network element, a second port probing for a second port of the first network element;
wherein a first port modulation pattern associated with the port probing and a second port modulation pattern associated with the second port probing are determined based on coding.

10. An apparatus, comprising:
a first network element configured for communication at a first communication layer and comprising a first port and a second network element configured for communication at a second communication layer different than the first communication layer and comprising a second port, wherein the first port and the second port are configured to be connected via a cross-layer link;
the first network element configured to:
receive, from a first element controller associated with the first network element, probe information indicative of probing to be performed on the first port; and
perform probing on the first port based on the probe information indicative of probing to be performed on the first port;
the second network element configured to:
detect a set of events associated with the second port; and
send, toward a second element controller associated with the second network element, event information indicative of the set of events associated with the second port.

11. The apparatus of claim 10, wherein:
the first network element comprises a packet network element and the second network element comprises an optical network element; or
the first network element comprises an optical network element and the second network element comprises a packet network element.

12. An apparatus, comprising:
a first network element configured for communication at a first communication layer and comprising a first port and a second network element configured for communication at a second communication layer and comprising a second port, wherein the first port and the second port are configured to be connected via a cross-layer link;
the first network element configured to:
receive, from a first element controller associated with the first network element, probe information indicative of probing to be performed on the first port, wherein the probe information comprises a set of port modulation commands associated with a port modulation pattern for the first port; and
perform probing on the first port based on the probe information; and
the second network element configured to:

detect a set of events associated with the second port; and send, toward a second element controller associated with the second network element, event information indicative of the set of events associated with the second port, wherein the event information comprises a set of notifications for the second port.

13. The apparatus of claim 12, wherein the set of port modulation commands is configured to modulate a characteristic of the first port.

14. The apparatus of claim 12, wherein the port modulation pattern comprises a set of predetermined signal power level changes based on a set of discrete signal power levels and predetermined timing information indicative of timing of the predetermined signal power level changes.

15. The apparatus of claim 12, wherein the first network element is configured to:

send, toward the first element controller, a set of acknowledgement responses indicative of execution of the port modulation commands at the first network element and indicative of respective times at which the port modulation commands were executed at the first network element.

16. An apparatus, comprising:

a first network element configured for communication at a first communication layer and comprising a first port and a second network element configured for communication at a second communication layer and comprising a second port, wherein the first port and the second port are configured to be connected via a cross-layer link;

the first network element configured to:
receive, from a first element controller associated with the first network element, probe information indicative of probing to be performed on the first port, wherein the probe information comprises a set of traffic migration commands associated with a traffic migration pattern for the first port; and
perform probing on the first port based on the probe information; and the second network element configured to:
detect a set of events associated with the second port; and
send, toward a second element controller associated with the second network element, event information indicative of the set of events associated with the second port, wherein the event information comprises a set of port traffic activity notifications for the second port.

17. The apparatus of claim 16, wherein the first network element is configured to:

send, toward the first element controller, a set of acknowledgement responses indicative of execution of the traffic migration commands at the first network element and indicative of respective times at which the traffic migration commands were executed at the first network element.

18. An apparatus, comprising:

a first network element configured for communication at a first communication layer and comprising a first port and a second network element configured for communication at a second communication layer and comprising a second port, wherein the first port and the second port are configured to be connected via a cross-layer link;

the first network element configured to:
receive, from a first element controller associated with the first network element, probe information indicative of probing to be performed on the first port; and
perform probing on the first port based on the probe information; and the second network element configured to:
determine a relationship between power received over the cross-layer link and an amount of traffic on the cross-layer link; and
send, toward a second element controller associated with the second network element or a network controller, an indication of the relationship between the power received over the cross-layer link and the amount of traffic on the cross-layer link.

19. An apparatus, comprising:

a processor and a memory communicatively connected to the processor, the processor configured to:
identify a set of ports comprising a set of ports of a packet network element and a set of ports of an optical network element, each of the ports having a respective connection type associated therewith;
classify the ports, based on the respective connection types of the ports, to determine thereby a set of compatible ports, the set of compatible ports comprising at least one of the ports of the packet network element and at least one of the ports of the optical network element; and
perform port isolation processing for the set of compatible ports, based on the respective connection types of the compatible ports, to identify a matching port pair including one of the ports of the packet network element and one of the ports of the optical network element that are connected via a cross-layer link.

20. The apparatus of claim 19, wherein, for each of the ports, the associated connection type is an electrical connection type or an optical connection type.

21. The apparatus of claim 19, wherein, based on a determination that the connection types of the compatible ports are electrical connections, port isolation processing is performed using at least one of port isolation based on port identification or port isolation based on port probing.

22. The apparatus of claim 21, wherein port isolation based on port probing comprises at least one of active probing, passive probing based on traffic migration, or passive probing based on traffic injection.

23. The apparatus of claim 19, wherein, based on a determination that the connection types of the compatible ports are optical connections, port isolation processing is performed using port probing.

24. The apparatus of claim 23, wherein the port probing comprises at least one of active probing, passive probing based on traffic migration, or passive probing based on traffic injection.

* * * * *